(12) United States Patent
Rakitic et al.

(10) Patent No.: US 12,152,964 B2
(45) Date of Patent: Nov. 26, 2024

(54) LEAK DETECTION SYSTEM AND METHOD OF MAKING AND USING THE SAME

(71) Applicant: SAINT-GOBAIN PERFORMANCE PLASTICS CORPORATION, Solon, OH (US)

(72) Inventors: Jean-Philippe Rakitic, Rosheim (FR); Charles S. Golub, Westford, MA (US); Stéphane Domy, Chaumontel (FR); Adam P. Nadeau, Boylston, MA (US); Edmund Burnett, Brighton, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 250 days.

(21) Appl. No.: 17/453,508

(22) Filed: Nov. 4, 2021

(65) Prior Publication Data

US 2022/0146358 A1 May 12, 2022

Related U.S. Application Data

(60) Provisional application No. 63/110,758, filed on Nov. 6, 2020.

(51) Int. Cl.
*G01M 3/16* (2006.01)
*G01M 3/18* (2006.01)

(52) U.S. Cl.
CPC ............ *G01M 3/165* (2013.01); *G01M 3/182* (2013.01)

(58) Field of Classification Search
CPC ........ G01M 3/165; G01M 3/18; G01M 3/182; G01F 23/0007; G01F 23/241; G01F 23/242

See application file for complete search history.

(56) References Cited

U.S. PATENT DOCUMENTS

| | | |
|---|---|---|
| 7,239,246 B2 | 7/2007 | Picco et al. |
| 7,383,721 B2 | 6/2008 | Parsons et al. |
| 7,973,667 B2 * | 7/2011 | Crnkovich .......... A61M 1/3656 604/4.01 |
| 9,517,296 B2 | 12/2016 | Fulkerson et al. |
| 11,105,705 B1 * | 8/2021 | Lowitz ................. G05D 7/0641 |
| 2005/0248356 A1 | 11/2005 | Care |
| 2010/0302047 A1 * | 12/2010 | Wood ..................... G01M 3/16 340/605 |
| 2012/0018014 A1 | 1/2012 | Fernandes et al. |
| 2013/0333447 A1 | 12/2013 | White et al. |

(Continued)

FOREIGN PATENT DOCUMENTS

| | | |
|---|---|---|
| CN | 209054343 U | 7/2019 |
| JP | 2000171326 A | 6/2000 |

(Continued)

OTHER PUBLICATIONS

International Search Report and Written Opinion for PCT/US2021/072229, mailed Feb. 18, 2022, 12 pages.

*Primary Examiner* — Alexander A Mercado
(74) *Attorney, Agent, or Firm* — Abel Schillinger, LLP; Chi Suk Kim

(57) ABSTRACT

A leak detection sensor including a dielectric substrate including a circuit board material; and a plurality of electrical circuits in communication with the substrate, where the plurality of electrical circuits are located on different sides of the substrate.

17 Claims, 9 Drawing Sheets

(56) References Cited

U.S. PATENT DOCUMENTS

| | | | |
|---|---|---|---|
| 2015/0330930 A1* | 11/2015 | Gao | G01N 27/12 252/514 |
| 2016/0238181 A1 | 8/2016 | Suzuta et al. | |
| 2016/0284193 A1* | 9/2016 | Davis | G08B 21/18 |
| 2017/0003192 A1 | 1/2017 | Ling et al. | |
| 2017/0363501 A1 | 12/2017 | Franz et al. | |
| 2019/0162625 A1 | 5/2019 | Carr et al. | |
| 2021/0199532 A1 | 7/2021 | Golub et al. | |

FOREIGN PATENT DOCUMENTS

| | | | |
|---|---|---|---|
| JP | 2018519514 | A | 7/2018 |
| KR | 101776006 | B1 | 9/2017 |
| KR | 20180116762 | A | 10/2018 |
| KR | 20190014937 | A | 2/2019 |
| TW | 201925743 | A | 7/2019 |
| WO | 2004038357 | A1 | 5/2004 |
| WO | 2013188734 | A1 | 12/2013 |
| WO | 2022099280 | A1 | 5/2022 |

* cited by examiner

LEAK DETECTION SYSTEM AND METHOD OF MAKING AND USING THE SAME

CROSS-REFERENCE TO RELATED APPLICATION(S)

This application claims priority under 35 U.S.C. § 119(e) to U.S. Provisional Application No. 63/110,758, entitled "LEAK DETECTION SYSTEM AND METHOD OF MAKING AND USING THE SAME," by Jean-Philippe RAKITIC et al., filed Nov. 6, 2020, which is assigned to the current assignee hereof and incorporated herein by reference in its entirety.

FIELD OF THE DISCLOSURE

The present disclosure relates to a leak detection system and method of making and using the same.

RELATED ART

Many industrial and commercial applications involve the use of fluids which may be used, for example, in processing steps, fabrication functions such as masking or etching, or temperature control. Some fluids may be particularly harmful or require special attention in light of adverse environmental or biological effects. Other fluids may be exceptionally valuable, and thus leaks result in loss to a user. Other fluids may have purity requirements and leakage would risk external contamination, which may ruin their respective fluid systems.

Many industries require new ways to effectively and accurately monitor for leakage of harmful or valuable fluids in more sustainable and economical ways.

BRIEF DESCRIPTION OF THE DRAWINGS

Embodiments are illustrated by way of example and are not intended to be limited in the accompanying figures.

DETAILED DESCRIPTION

Figure 1:
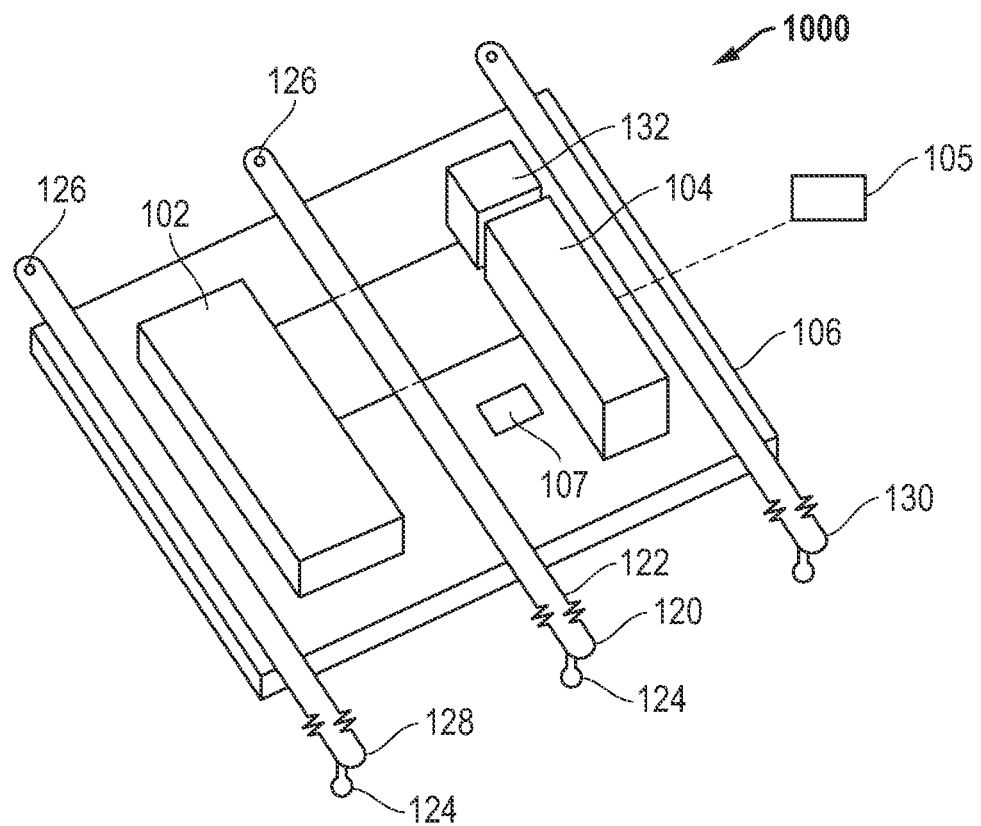
FIG. 1 includes a perspective view of an example leak detection system in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluid transport arts.

A leak detection system in accordance with one or more of the embodiments described herein may generally include at least one sensor, a communication device coupled to the sensor, and an attachment element adapted to operatively couple the leak detection system to an area for monitoring fluid leakage. In an embodiment, the leak detection system may be disposed adjacent to a fluid interface on a fluid component. According to certain embodiments, the fluid component may include a junction whereby fluid may leak from the fluid interface such as, for example, a pipe junction, a pipe coupling, a pipe, a pipe bend, a manifold, an elbow, a valve, a pump, a regulator, a liquid trap, a pressure vessel, a tank, a filter housing, an exhaust line, a vacuum condensate container, a seam or weld line, a nozzle or sprayer, a threaded port, a sampling valve, a fluid inlet or outlet, or any other similar junction. In another embodiment, the sensor can have a first state having a first condition when dry and a second condition when wet. In an embodiment, the sensor can have a second state adapted to monitor the operability of the sensor. In an embodiment, the sensor can have a third state adapted to monitor a measure of the battery life of the sensor. In an embodiment, the sensor can have a fourth state adapted to monitor signal strength of the sensor. The signal strength may be the gateway communication signal of the sensor with the communication device (e.g. whether the communication device "hears" the sensor). The communication device may transmit the condition (first, second, third, or fourth) through a wireless protocol or wired connection to a communication hub or receiving device adapted to communicate the condition of the area being monitored to a user or system which may respond to the leakage. In a particular embodiment, the attachment element may be removable, reusable, or both. That is, the attachment element may be selectively engaged with a fluid component or area or surface of the fluid component being monitored and selectively disengaged therefrom. In an embodiment, the sensor may have a dielectric substrate connected to a plurality of electrical circuits located on different sides of the substrate.

According to certain embodiments, leak detection systems as described herein may be positioned to monitor leakage on fluid component spanning several different technical specialties. For example, a leak detection system in accordance with one or more embodiments described herein may be utilized in electronic device fabrication such as in the semiconductor and superconductor industry; medical devices such as fluid transport lines and pumps such as in the biological and pharmaceutical industry; pipe couplings such as those found in the oil and gas industry, potable water and sewer systems; aerospace industry in fabrication, maintenance, and design; food and beverage industry; and in the automotive industry. In specific embodiments, the leak detection system may be attached to a fluid component housing. In embodiments, the fluid may be any non-Newtonian fluid. In embodiments, the fluid may be a polar or a non-polar fluid. In embodiments, the leak detection system may monitor leakage of a specific type of fluid while being indifferent to leaks of another type of fluid (e.g. selective). In specific embodiments, the leak detection system may be adapted to monitor a leak of a fluid which may include at least one of HF, $H_2SO_4$, $HNO_3$, $NaClO$, $H_2O_2$, $H_3PO_4$, Chemical Mechanical Planarization (CMP) fluids and slurries, HCL, deionized water, ethanol, isopropyl alcohol, acetone, a hydrocarbon solvent, or toluene. In some embodiments, the fluid may a fluid used in semiconductor manufacturing. According to yet other embodiments, leak detection systems described herein may reduce response time to leaks by quickly and accurately detecting small fluid leakages, allowing an operator to address a possible leak before it has an opportunity to grow larger.

In accordance with an embodiment, the sensor may be adapted to perceive a particular fluid leakage. For example, the sensor may be adapted to perceive a fluid leakage of about 0.0001 mL to about 1 mL. In a number of embodiments, the sensor may be adapted to perceive a fluid leakage of at least about 0.0001 mL, such as, at least 0.001 mL, or at least 0.01 mL, or at least 0.05 mL, or at least 0.1 mL.

FIG. 1 includes an illustration of a leak detection system 1000 including a sensor 100. As shown in FIG. 1, a leak detection system 1000 and/or sensor 100 may generally include at least one sensing element 102 and a communication device 104. The sensing element 102 and communication device 104 may be coupled to a common carrier, such as a substrate 106, which can maintain the sensing element 102 and communication device 104 spatially coupled to one another. In another embodiment, described below, the sensing element 102 and communication device 104 may be coupled to one another or to another object of the leak detection system 1000, allowing for removal of substrate 106. In a number of embodiments, optionally, the leak detection system 1000 may include a salt puck 107 to dissolve components of the fluid for better monitoring through the sensing element 102. In a number of embodiments, the sensing element 102, may include a dielectric substrate including a circuit board material, and a plurality of electrical circuits in communication with the substrate and located on different sides of the substrate, as described in further detail below. Further, the plurality of circuits can each include an electrically conductive trace connected to a plurality of pins extending from the trace, as described in further detail below.

Figure 2:
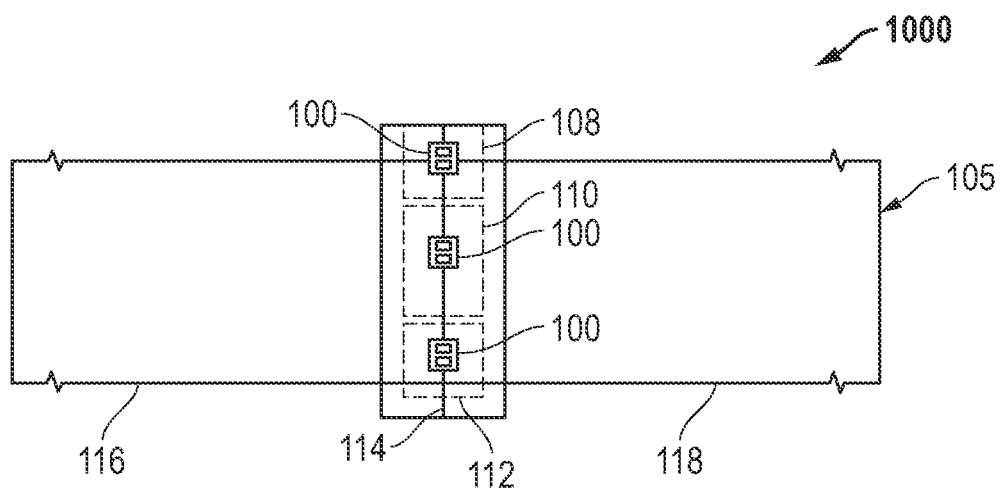
FIG. 2 includes a side elevation view of a plurality of example leak detection systems in accordance with embodiments disposed on a fluid interface between joining fluid components.

FIG. 2 includes a side elevation view of a plurality of exemplary leak detection systems 1000 in accordance with embodiments disposed on a fluid interface 114 between joining fluid components 121. As illustrated in FIG. 2, at least one leak detection system 1000 may be operatively coupled to a fluid component 121 having a surface with a fluid interface 114, such as for example, between axial ends of a first fluid conduit 116 and a second fluid conduit 118, for monitoring fluid leakage there between. A plurality of leak detection systems 1000 may be placed anywhere on the surface or fluid interface 114 of the fluid component 121. Each leak detection system 1000 may monitor an area 108, 110, and 112 for fluid leakage. In an embodiment, the areas 108, 110, and 112 may each be at least 1 $cm^2$, such as at least 2 $cm^2$, or at least 3 $cm^2$, or at least 4 $cm^2$, or at least 5 $cm^2$, or at least 10 $cm^2$, or at least 20 $cm^2$, or at least 30 $cm^2$, or at least 40 $cm^2$, or at least 50 $cm^2$, or at least 75 $cm^2$, or at least 100 $cm^2$. In an embodiment, the areas 108, 110, and 112 may be equal in size and have the same relative shape as one another. In another embodiment, the areas 108, 110, and 112 need not have the same shape or size. That is, area 108 may be larger than area 110. Alternatively, area 112 may have a generally circular shape whereas area 108 may be generally rectangular. The shape and size of the area 108, 110, and 112 may depend on several factors such as, for example, the size or sensitivity of the sensing element 102, the relative location of the sensing element 102, or even the type of fluid being monitored. For example, a sensing element 102 disposed at a lower position of a fluid conduit may monitor a larger area as fluid might pool or collect at the bottom of the fluid conduit, whereas a sensing element 102 disposed at an upper position of the fluid conduit might monitor only a small area as fluid may be less likely to collect at the upper position. In a particular embodiment, a single leak detection system 1000 may be positioned at a vertically lowest location along the fluid conduit.

In a particular instance, the areas 108, 110, and 112 may be adjacent to one another, such as immediately adjacent to one another or slightly spaced apart from one another. That is, the areas 108, 110, and 112 may not overlap each other. In another instance, at least two of the areas 108, 110, and 112 may at least partially overlap. That is, the at least two areas 108, 110, and 112 may share a common area. For example, by way of a non-limiting embodiment, areas 108 and 110 may each be 10 cm$^2$ with at least 2 cm$^2$ overlap there between. Thus, the effective monitored area (as covered by areas 108 and 110) is 18 cm$^2$.

According to certain embodiments, at least two of the leak detection systems 1000 may overlap by a particular amount. For example, at least two of the leak detection systems 1000 can overlap by at least 1%, or at least 2%, or at least 3%, or at least 4%, or at least 5%, or at least 10%, or at least 25%. In another particular embodiment, the at least two leak detection systems 1000 can overlap by no greater than 99%, or no greater than 98%, or no greater than 97%, or no greater than 96%, or no greater than 95%, or no greater than 90%, or no greater than 75%. In an embodiment, the two leak detection systems 1000 can overlap by at least about 1% and no greater than about 99%. Overlapping at least two of the areas 108, 110, and 112 may reduce the rate of failure to detect a leakage that might otherwise occur if one of the leak detection systems 1000 were to fail.

Figure 3:
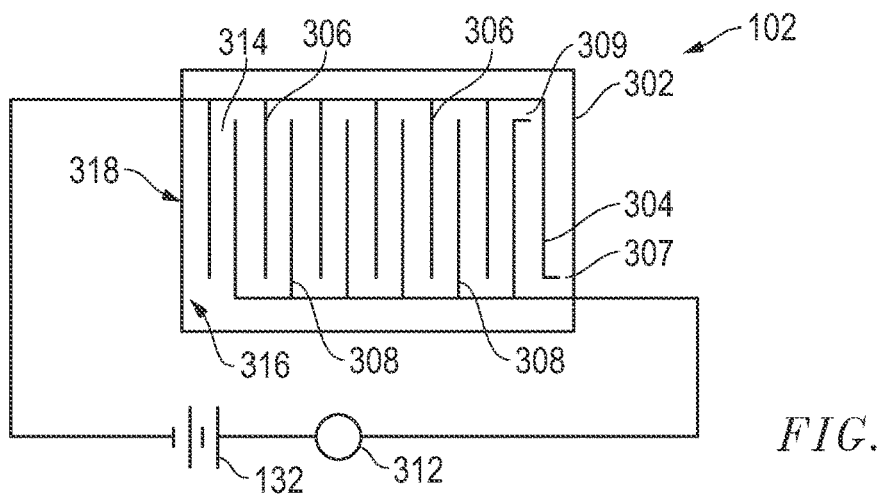
FIG. 3 includes a schematic view of a sensor including a sensing element in accordance with an embodiment.

FIG. 3 includes a schematic view of a sensor 100 including a sensing element 102 in accordance with an embodiment. As illustrated in FIG. 3, in an embodiment, the sensing element 102 may include a substrate 302. In a number of embodiments, the sensing element 102 may include a detection element 304. The detection element 304 may be attached to the substrate 302, such as for example, by an adhesive, a threaded or non-threaded fastener, a surface roughness interface, a tie layer, a mechanical fastener, or another suitable method.

In an embodiment, the detection element 304 may be adapted to change in response to fluid contact. In an embodiment, the detection element 304 may be adapted to monitor the operability of the sensing element 102 or the leak detection system 1000. In an embodiment, the detection element 304 may have a first state having a first condition that may be adapted to change in response to fluid contact, and a second state that may be adapted to monitor the operability of the sensing element 102 or the leak detection system 1000. In an embodiment, the detection element 304 may include an electrical circuit. More particularly, the detection element 304 may include a broken circuit in the dry condition and a closed circuit in the wet condition (i.e., upon fluid contact). In a particular embodiment, the electrical circuit can include a plurality of first fingers or traces 306 and a plurality of second fingers or traces 308, where the first and second plurality of fingers 306 and 308 are spaced apart by a gap 314 having a distance, D, so as to be electrically disconnected from one another. The distance, D, may be uniform between a length of the fingers 306 and 308 or nonuniform (e.g., wavering or changing). In a number of embodiments, the distance D between the sensor traces or fingers 306, 308 may be a range of about 0.001 mm to about 5 mm. Fluid interaction with the substrate 302 may bridge the gap 314, creating a closed circuit through which current may flow. The sensor traces 306, 308 may each be operatively attached or connected to a plurality of pins 307, 309 extending from the respective traces 306, 308. The pins 307, 309 may be formed of a conductive material through which current may flow, as known commonly in the art. Further, the pins 307, 309 may be extendable from the traces 306, 308 as described in further detail below. The pins 307, 309 may be applied to any of the detection elements as described and as exemplary shown below. A power source 132 (discussed in greater detail below) electrically biasing the detection element 304 may permit current flow when the circuit is closed. Upon such occurrence, the detection element 304 may switch from a first condition (indicating the sensing element 102 is dry) to a second condition (indicating the sensing element 102 is wet), causing the communication device 104 (FIG. 1) to transmit a signal relaying occurrence of a fluid leakage. Such action may occur, for example, by a change in voltage, current, or resistance as measured by an appropriate element 312 electrically coupled to the detection element 304. The signal may be digital or analog.

In an embodiment, the detection element 304 may include a wire having one or more disconnected segments along a length thereof. Upon contacting a fluid, the disconnected segments may be bridged, creating a closed circuit through which current may flow. In an embodiment, at least one of the disconnected segments may have a length, as measured by a shortest distance between two segments of the wire which, if bridged, would complete the circuit, of at least 0.001 inches, such as at least 0.01 inches, or at least 0.1 inches, or even at least 1 inch. In another embodiment, the length of the disconnected segments may be no greater than 10 inches, such as no greater than 5 inches, or even no greater than 2 inches. Shorter disconnected segment lengths may decrease the time required to close the circuit, accelerating the rate of leak detection.

In an embodiment, leak detection elements 304 may be particularly suitable for applications where the fluid being monitored is conductive. That is, closing the circuit is performed by bridging the gap 314, which in turn requires a conductive medium. Exemplary conductive fluids include distilled water, salt water, alcohol, acid, and liquid metal.

In a particular embodiment, the substrate 302 may include a material adapted to rapidly transfer fluid from the surface being monitored to the detection element 304. For example, the substrate 302 may include a wicking material or other suitable material having a high fluid transfer rate. Exemplary materials include closed or open-cell foam, woven or non-woven mesh, textiles, and polymers. It is believed that the use of materials having high fluid transfer rates may accelerate transfer of fluid from the fluid interface to the detection element 304, reducing sensing time and, in turn, accelerating leak detection. In a number of embodiments, the substrate may be a dielectric substrate comprising a non-conductive material. The non-conductive material may include a polymer such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, elastomers (including but not limited to, rubber, or silicone based elastomers), thermoset materials, or any combination thereof. In an example, the inner member 4 can at least partially include a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the non-conductive material may include includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the non-conductive material may include includes polyketone, such as polyether ether ketone (PEEK), polyether ketone, polyether ketone ketone, polyether ketone ether ketone, a derivative thereof, or a combination thereof. In a specific example, the non-conductive material may include can include a fluoropolymer. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. In an embodiment, the non-conductive material may include can at least partially include a ceramic including, but not limited to, barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. In a number of embodiments, the dielectric substrate may be a non-conductive material adapted to house a circuit such as, but not limited to, a circuit board or circuit board material as described in more detail below. Examples of circuit board materials include FR-1 thru FR-6, CEM-1 thru CEM-5, G-10 and G-11, Aluminum or insulated metal substrate (IMS), Polytetrafluoroethylene (PTFE), RF-35, Polyimide, Alumina and flexible substrates Pyralux and Kapton.

In an embodiment, the substrate 302 may have a thickness, as measured in the installed state, of no greater than 10 inches, such as no greater than 5 inches, or no greater than 1 inch, or no greater than 0.75 inches, or no greater than 0.5 inches, or no greater than 0.1 inches, or even no greater than 0.01 inches. In another embodiment, the substrate 302 may have a thickness, as measured in the installed state, of at least 0.001 inches. In an embodiment, the substrate 302 may have a thickness, as measured in the installed state, of at least about 0.001 inches to about 10 inches. In a particular instance, the substrate 302 may deform during installation. That is, the substrate 302 may elastically or plastically deform from its uninstalled shape. Such deformation may permit the substrate 302 to better fit with contours and undulations of the surface onto which the leak detection system 1000 is being installed. Deformation may occur through flexure, compression, or expansion of the substrate as caused, for example, by forces necessary to secure the leak detection system 1000 to the surface.

In an embodiment, prior to installation, in a relaxed state, the substrate 302 may be generally planar. That is, the substrate 302 may deviate from a plane by no greater than 2 inches, 1.5 inches, 1 inch, 0.5 inches, or 0.25 inches at any location therealong. In another embodiment, the substrate 302 can be sufficiently flexible such that when positioned on a planar surface the substrate 302 assumes a generally planar shape.

In another embodiment, prior to installation, in a relaxed state, the substrate 302 may have a generally arcuate cross section. For example, the substrate 302 may have a radius of curvature, R, of at least 1 inch, such as at least 2 inches, or at least 3 inches, or at least 4 inches, or at least 5 inches, or at least 6 inches, or at least 12 inches, or at least 24 inches, or even at least 48 inches. In an embodiment, R can be no less than 0.001 inches. In an embodiment, R can be no less than 0.001 inches and no greater than 48 inches. Such arcuate-shaped substrates 302 may be suitable for engagement, for example, with fluid conduits (e.g., pipes and tubing) having circular cross-sections. The radius of curvature of the substrate 302 may be selected to best fit the shape and size of the fluid conduit or surface being monitored. In a particular embodiment, the substrate 302 can have an arcuate cross section in the relaxed state and may flex upon occurrence of a sufficient loading condition. This may permit low-strain usage of the substrate 302 with fluid conduits while simultaneously permitting flexure to accommodate deviations in the surface profile and texture of the fluid conduit.

In a particular instance, the substrate 302 may have an initial thickness, $T_I$, different from an installed thickness, $T_E$. $T_I$ may be greater than $T_E$. For example, $T_I$ may be at least 1.01 $T_E$, or at least 1.05 $T_E$, or at least 1.1 $T_E$, or at least 1.2 $T_E$, or at least 1.3 $T_E$, or at least 1.4 $T_E$, or at least 1.5 $T_E$, or at least 2.0 $T_E$, or at least 5.0 $T_E$. In an embodiment, $T_I$ may be no greater than 100 $T_E$, or no greater than 50 $T_E$, or no greater than 25 $T_E$. In an embodiment, $T_I$ may be at least 1.01 $T_E$ and no greater than about 100 $T_E$. $T_I$ and $T_E$ may be measures of absolute thickness (thickness at a particular location) or average thickness of the substrate 302 as measured over select areas of the substrate 302 or the entire area of the substrate 302.

The substrate 302 may define opposing major surfaces or sides—i.e., a first major surface 316 and a second major surface 318, spaced apart by the thickness of the substrate 302. The detection element 304 may be disposed along one of the first and second major surfaces 316 and 318. As illustrated, in an embodiment, the detection element 304 may be disposed centrally along the major surface 316 or 318. Such central position may maximize the volume and speed of fluid interaction with the detection element 304 by displacing the detection element 304 equally from all edges of the substrate 302. This may decrease detection regardless of the edge of the substrate 302 fluid first contacts. Alternatively, by way of an embodiment, the detection element 304 may be disposed at a peripheral portion of the substrate 302, i.e., closer to one of the edges. Such position may be suitable for leak detection systems 1000 having particular applications with a nonsymmetrical interface.

In a particular embodiment, the detection element 304 can occupy less than 90% of a surface area of the substrate 302, or less than 80% of the surface area of the substrate 302, or less than 70% of the surface area of the substrate 302, or less than 60% of the surface area of the substrate 302, or less than 50% of the surface area of the substrate, or less than 40% of the surface area of the substrate, or less than 30% of the surface area of the substrate, or less than 20% of the surface area of the substrate, or less than 10% of the surface area of the substrate, or less than 1% of the surface area of the substrate. In another particular embodiment, the detection element 304 can occupy at least 0.001% of the surface area of the substrate 302. In another particular embodiment, the detection element 304 can occupy at least about 0.001% of the surface area of the substrate 302 and no greater than 90% of the surface area of the substrate 302.

Figure 4:
FIG. 4 includes a cross-sectional elevation view of a sensor including a sensing element in accordance with an embodiment.

FIG. 4 includes a cross-sectional elevation view of a sensor 100 including a sensing element 102 in accordance with an embodiment. As illustrated in FIG. 4, in accordance with a particular embodiment, the detection element 304 may be at least partially embedded within the substrate 302. That is, at least a portion of the detection element 304 may be disposed between the major surfaces 316 and 318 of the substrate 302. In a more particular embodiment, at least a portion of at least one of the first or second plurality of fingers 306 or 308 may be embedded within the substrate 302. In another embodiment, all of at least one of the first or second plurality of fingers 306 or 308 may be embedded within the substrate 302. In yet a further embodiment, all of the first and second plurality of fingers 306 and 308 may be embedded within the substrate 302. Disposition of at least a portion of the detection element 304 between the major surfaces 316 and 318 may accelerate leak detection by reducing a distance, as measured in a direction normal to the major surfaces 316 and 318, fluid is required to travel to bridge the gap 314 (FIG. 3) and close the circuit.

As illustrated, in an embodiment, at least one of the first plurality of fingers 306 may be vertically offset (in a direction normal to the major surfaces 316 and 318) from at least one of the second plurality of fingers 308. Such positioning may accelerate detection timing by further reducing a distance between the detection element 304 and, at 1 the surface being monitored. In another embodiment, the first and second plurality of fingers 306 and 308 may be disposed at a same relative position with respect to the major surfaces 316 and 318.

Figure 5:
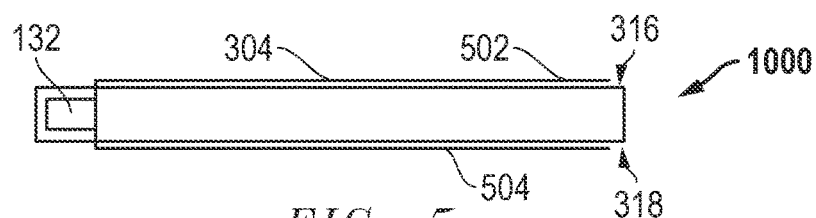
FIG. 5 includes a cross-sectional elevation view of a sensor including a sensing element in accordance with another embodiment.

FIG. 5 shows a cross-sectional elevation view of a sensor 100 including a sensing element 102 in accordance with another embodiment. As illustrated in FIG. 5, the detection element 304 may be disposed at least partially on both major surfaces 316 and 318. For example, a first detection element 502 may be disposed on the first major surface 316 and a second detection element 504 may be disposed on the second major surface 318. Disposition of the first detection system 502 on the first major surface 316 and the second detection element 504 on the second major surface 318 may permit reversible installation of the detection element 304 on a surface for fluid monitoring. In an embodiment, the leak detection elements 502 and 504 may share a single power source 132. In an embodiment, the leak detection elements 502 and 504 and may each utilize separate power sources. Lithium batteries or rechargeable batteries or other battery forms can be used as part of the power source 132.

In accordance with an embodiment, the sensor 100 including a sensing element 102 may include a detection element 304 coupled to a substrate 302, where the sensing element 102 or detection element 304 may be adapted to have one or more changing characteristics or measured properties in response to fluid contact. In these embodiments, the detection element 304 may include an electrical circuit. In this embodiment, the substrate 302 may define opposing major surfaces—i.e., a first major surface 316 and a second major surface 318, spaced apart by the thickness of the substrate 302. The detection element 304 may be disposed along one of the first and second major surfaces 316 and 318. In a number of embodiments, a first detection element (or electrical circuit) 502 may be in communication with or disposed on the first major surface 316 and a second detection element (or electrical circuit) 504 may be in communication with or disposed on the second major surface 318. The first major surface 316 may be opposite the second major surface 318. In a number of embodiments, detection elements 502, 504 may be located on adjacent surfaces of the substrate 302. In an embodiment, the leak detection elements 502 and 504 may share a single power source 132. In an embodiment, the leak detection elements 502 and 504 and may each utilize separate power sources. Lithium batteries or rechargeable batteries or other battery forms can be used as part of the power source 132.

In accordance with an embodiment, the sensing element 102 may include a detection element 304 coupled to a plurality of substrates 302 sharing or operatively connected to a single power source. Specifically, the sensing element may have a first substrate 302a and a second substrate 302b where the first detection element 502 is in communication with the first substrate 302a and a second detection element 504 is in communication with the second substrate 302b. In an embodiment, the leak detection elements 502 and 504 may share a single power source 132. In an embodiment, the leak detection elements 502 and 504 and may each utilize separate power sources.

As discussed above and in further detail below, the detection elements 502 and 504 may each include an electrical circuit paired to a substrate that may include a circuit board.

Figure 6:
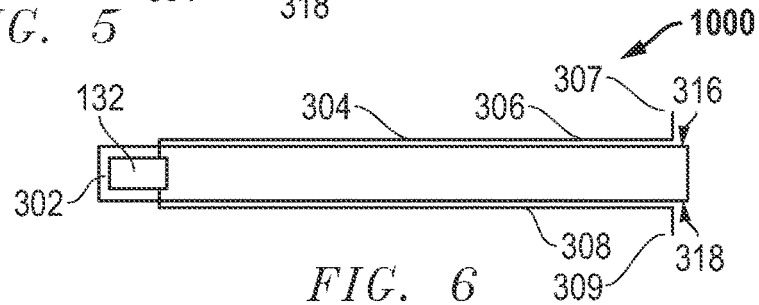
FIG. 6 includes a cross-sectional elevation view of a sensor including a sensing element in accordance with another embodiment.

FIG. 6 includes a cross-sectional elevation view of a sensor 100 including a sensing element 102 in accordance with another embodiment. As illustrated in FIG. 6, in an embodiment, a single leak detection element 304 can be disposed on the substrate 302 such that at least one of the first plurality of fingers 306 may be adjacent to the first major surface 316 and at least one of the second plurality of fingers 308 may be adjacent to the second major surface 318. As illustrated, the first and second plurality of fingers 306 and 308 may be disposed on the first and second major surfaces 316 and 318, respectively. In another particular embodiment, at least one of the first and second plurality of fingers 306 and 308 may be at least partially embedded within the substrate 302 adjacent to the first and second major surfaces 316 and 318, respectively.

Referring again to FIG. 4, in an embodiment, the power source 132 may be disposed adjacent to one of the major surfaces 316 or 318. In a particular embodiment, the power source 132 may be disposed on the major surface 316 or 318. That is, the power source 132 may rest on the major surface 316 or 318. In operation, the opposite major surface 316 or 318 (i.e., the major surface opposite the power source) may be disposed on the surface being monitored to permit flush contact therewith.

In another particular embodiment, the power source 132 may be partially embedded within the substrate 302 so as to extend into the substrate while being partially visible. In yet a further embodiment, such as illustrated in FIGS. 5 and 6, the power source 132 may be fully embedded within the substrate 302. Electrical contacts may extend from the substrate, allowing for coupling of the detection element and communication device.

Figure 7:
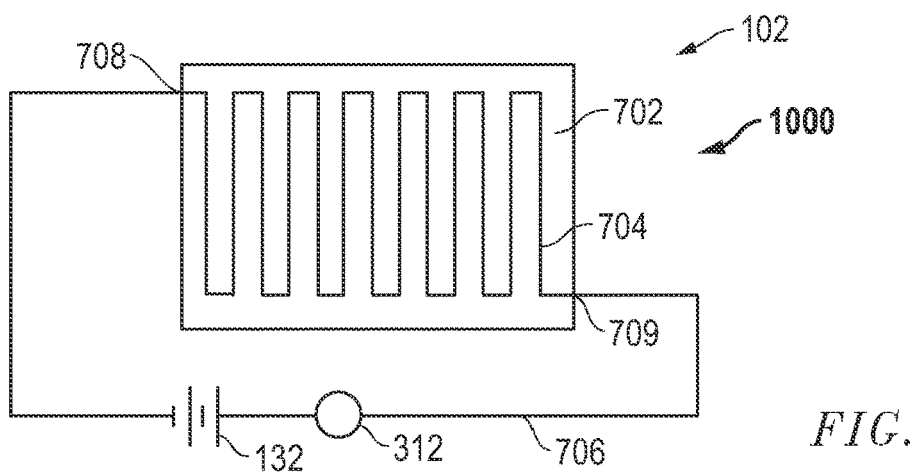
FIG. 7 includes a schematic view of a sensor including a sensing element in accordance with another embodiment.

FIG. 7 includes a schematic view of a sensor 100 including a sensing element 102 in accordance with another embodiment. As illustrated in FIG. 7, in an embodiment, the sensing element 102 may include a detection element 704 defining a closed circuit in the dry condition and a broken circuit in the wet condition (i.e., upon fluid contact). The detection element 704 may be coupled to a substrate 702. In an embodiment, the substrate 702 can have any or all of the characteristics as described above with respect to substrate 302. For example, the substrate 702 may have an initial thickness, $T_I$, different from an installed thickness, $T_E$. In another embodiment, the substrate 702 may be different from the substrate 302. For example, as described below, application of the detection element 704 may be best suited for use with corrosive or deleterious fluids which may break or disrupt a continuous wire 706 upon exposure. Thus, it may be desirable to utilize a substrate adapted to withstand exposure to the damaging effects of the corrosive or deleterious fluid. As used herein, "wire" refers to a conductive member having a length and a thickness, where the length is greater than the thickness. Exemplary wires include cylindrical wires, wound wires, single-thread wires, ribbons, bands, sheets, cords, and other similar elements. The wire may be a conductive material. In a number of embodiments, the wire may be metal material comprising copper.

In an embodiment, it may be desirable for the substrate 702 to break down or become damaged upon contact with the corrosive or deleterious fluid. Specifically, the substrate 702 may break down upon contact with the fluid, causing more rapid advancement of the fluid through the substrate to the detection element.

In a particular instance, the wire 706 may have a total length, $L_W$, as measured by a length of the wire 706 on the substrate 702, that may be greater than an effective length, $L_E$, of the wire 706, as measured by a direct distance between the location the wire 706 enters 708 and exits 709 the substrate 702. In an embodiment, the wire 706 may pass over the substrate 702 in a non-straight line. As illustrated, the wire 706 may form a plurality of straight segments interconnected at 90 degree angles. The disclosure is not intended to be limited to those embodiments having 90 degree angles, but instead further includes interconnection of line segments at both acute and obtuse angles. In another embodiment, the wire 706 may have a generally serpentine shape or be a serpentine circuit. The wire 706 may have other shapes, which may include concentric circles, concentric ovals, zigzags, spirals, and other arcuate or straight segmented shapes having total lengths, $L_W$, greater than the effective length, $L_E$, on the substrate 702. It is believed that wires 706 with total lengths, $L_W$, greater than the effective length, $L_E$, may increase fluid sensitivity or even reduce sensing time.

Figure 8:
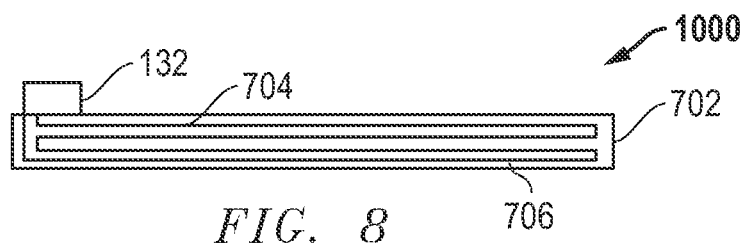
FIG. 8 includes a cross-sectional elevation view of a sensor including a sensing element sensor in accordance with an embodiment.

In an embodiment, the detection element 704 may include portions at least partially embedded within the substrate 702. FIG. 8 illustrates a cross-sectional view of the detection element 704 in accordance with an embodiment. As illustrated in FIG. 8, the wire 706 extends through the substrate 702 in a non-straight line. That is, the wire 706 extends through the substrate in a plurality of straight segments interconnected at 90 degree angles. The disclosure is not intended to be limited to those embodiments having 90 degree angles, but instead further includes interconnection of line segments at both acute and obtuse angles. Disposition of the wire 706 at various vertical elevations within the substrate 702 may permit reversible installation of the detection element 704 with respect to the surface being monitored. Additionally, the wire 706 occupies a greater relative volume of the substrate 702, which accelerates the rate at which a fluid contacting the substrate 702 will contact the wire 706.

In an embodiment, the detection element may include a conductive structure having a two- or three-dimensional matrix, or quasi-matrix shape instead of, or in addition to, the wire 706. In a particular instance, the conductive structure may have a low flexure modulus, permitting flexure of the detection element. A material may be positioned around the conductive structure, for example by overmolding or extruding, to protect the conductive structure or to facilitate easier attachment of the conductive structure to a surface for monitoring.

Figures 9, 10:
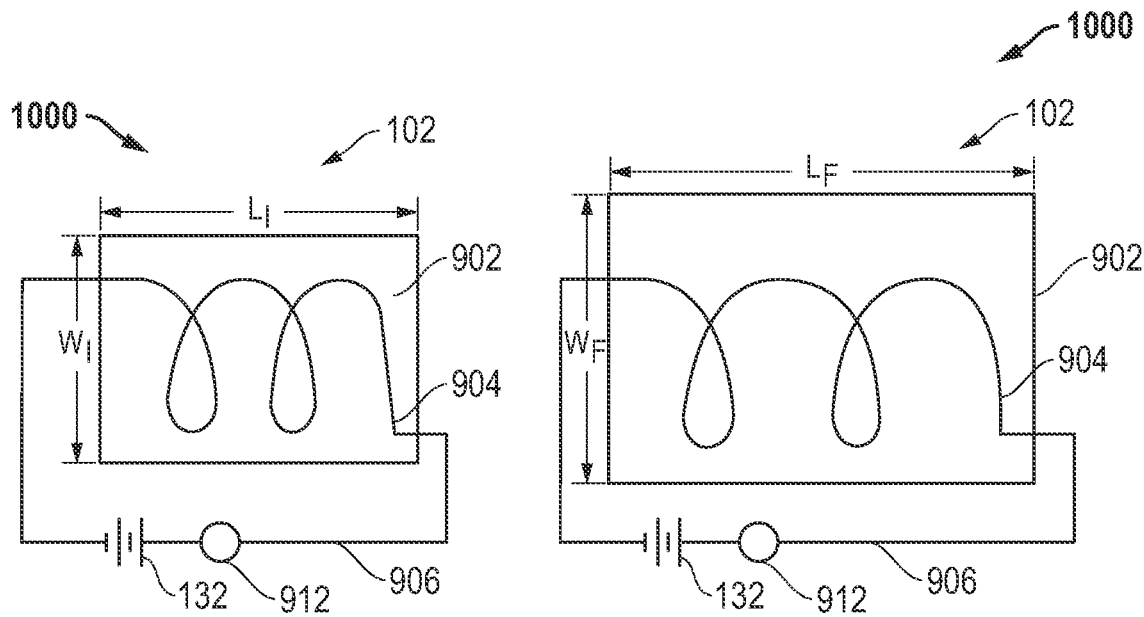
FIG. 9 includes a schematic view of another sensor including a sensing element in a dry condition in accordance with an embodiment.
FIG. 10 includes a schematic view of the sensor of FIG. 9 in a wet condition in accordance with an embodiment.

In a particular embodiment, the changing characteristic of the substrate 902 may be measured property of the substrate 902. For example, FIGS. 9-10 illustrate a sensor 100 including a sensing element 102 as seen prior to fluid contact. As shown in FIG. 9, the substrate 902 has an initial length, $L_I$, and an initial width, $W_I$. After contacting fluid, the substrate 902 can change in measured property, having a final length, $L_F$, and a final width, $W_F$, as illustrated in FIG. 10. In an embodiment, $L_I$ can be less than $L_F$ and $W_I$ can be less than $W_F$. In another embodiment, $L_I$ can be greater than $L_F$ and $W_I$ can be greater than $W_F$. A wire 906 extending across a portion of the substrate 902 can permit detection of a change in a measured property of the substrate 902. More particularly, an element 912 can measure conductivity, or another suitable characteristic, of the wire 906 as it changes with strain imposed by the substrate 902. When conductivity, or other suitable characteristic, changes, the detection system 902 may change from a first condition (dry) to a second condition (wet), thus permitting notification of a fluid leakage. Although the wire 906 is illustrated as having a looping shape including a plurality of loops, the wire 906 may also have any shape as described above with respect to wire 706.

In an embodiment, the substrate 902 may be formed from a material adapted to expand upon contact with fluid. For example, the substrate 902 may include, or consist essentially of, a fibrous material, a woven or non-woven material, a matrix or quasi-matrix based material, or any other suitable material adapted to expand upon contact with fluid, resulting in a physical change in at least one of the sensing element 902, detection element 904, and/or sensor 100 that results in a leakage detection.

The wire 906 may extend at least partially into the substrate 902. In an embodiment, a majority of the wire 906 may be embedded in the substrate 902. In a further embodiment, all of the wire 906 may be embedded in the substrate 902. Partial or full embedment of the wire 906 may improve speed of fluid leakage detection as forces acting on the substrate 902 may be more readily transmitted to an embedded wire 606 as opposed to a wire disposed on a major surface of the substrate 902.

Detection element 904 and substrate 902 may include any or all of the features discussed above with respect to detection elements 304 and 704, and substrate 302 and 702, respectively.

Figure 11:
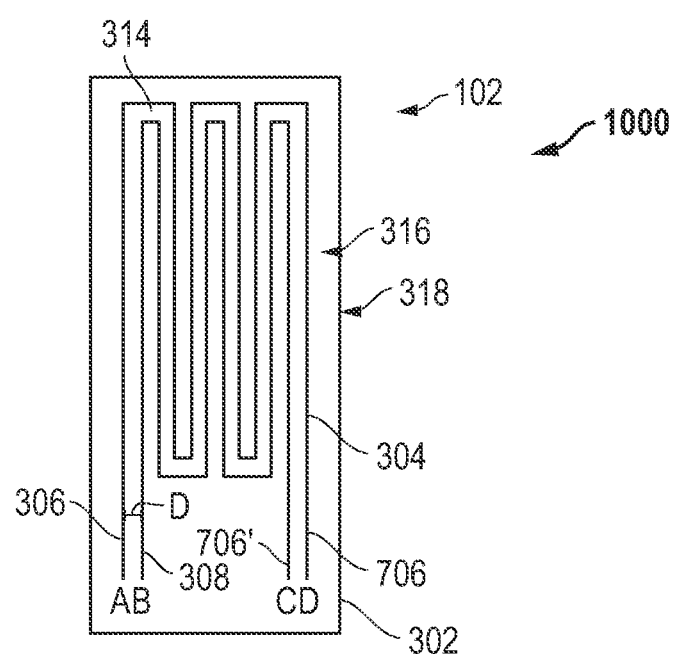
FIG. 11 includes a schematic view of another sensor including a sensing element having an electric circuit in accordance with an embodiment.
Figure 12:
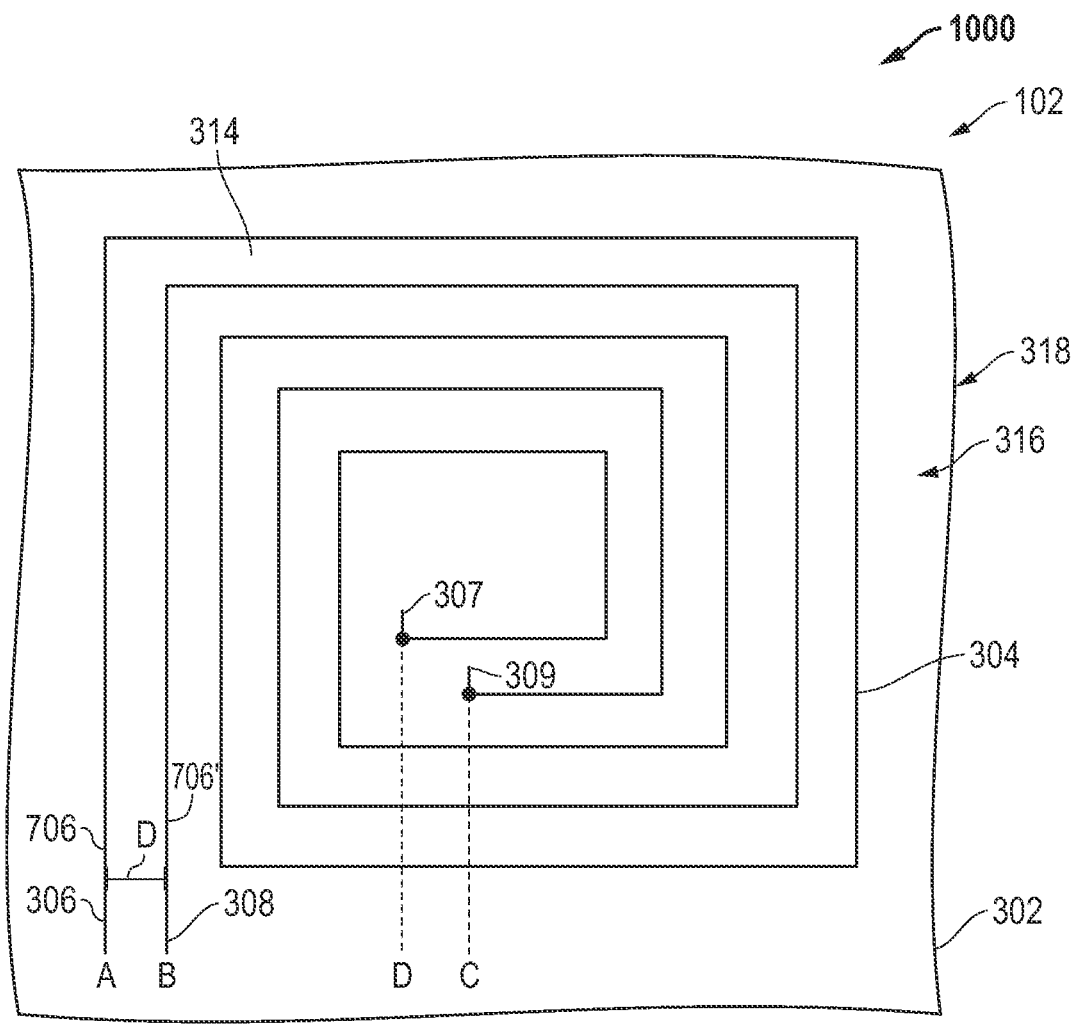
FIG. 12 includes a schematic view of another sensor including a sensing element having an electric circuit in accordance with an embodiment.

Referring now to FIGS. 11-12, in accordance with an embodiment, the sensor 100 including a sensing element 102 may include a detection element 304 coupled to a substrate 302, where the sensing element 102 or detection element 904 may be adapted to have one or more changing characteristics or measured properties in response to fluid contact.

In a particular embodiment, as shown in FIGS. 11-12, the sensing element 102 may include an electrical circuit. As shown in FIG. 3, the electrical circuit may form a geometric parallel comb circuit design. FIG. 11 shows a schematic view of another sensor having an electric circuit in accordance with an embodiment. As illustrated in FIG. 11, the electrical circuit that forms a geometric serpentine design between two wires 706 (between A and D), 706' (between B and C). FIG. 12 shows a schematic view of another sensor having an electric circuit in accordance with an embodiment. As illustrated in FIG. 12, the electrical circuit that forms a geometric spiral design between two wires 706 (between A and D), 706' (between B and C). The sensing element 102 may allow for series or parallel measurements of a measured property of the electrical circuit. The measured property may undergo a change in response to fluid contact that the sensing element 102 monitors and/or responds to via the communication device 104. The measured property may be at least one of resistance, impedance, capacitance, current, voltage, or another measured property of the detection element 304 or circuit. In a number of embodiments, the sensing element 102 may include two electrical circuits electrically connected in parallel. In a number of embodiments, the sensing element 102 may include two electrical circuits electrically connected in series. As shown above, each wire 706, 706' may be a conductive trace that is connected to a respective pin 307, 309 to form an electrical circuit. In a number of embodiments, the sensing element 102 can include a plurality of electrical circuits may each include an electrically conductive trace connected to a plurality of pins extending from the trace. In other words, the first detection element may include a first trace connected to a first pin and a second pin. The second detection element may include a first trace connected to a first pin and a second pin. The detection elements may be located on different sides of the substrate to detect leaks on different sides of the substrate as described in further detail below. In a number of embodiments, each detection element may have its own power source. As shown above, each detection element may share a power source. In an embodiment, the pins may be removable or extendable as described below.

In a number of embodiments, in a first state, the circuit of the sensing element 102 (and/or the sensor 100) may be monitored to have a first condition when dry and a second condition when wet. In a number of embodiments, in a second state, the sensing element 102 (and/or the sensor 100) may be adapted to monitor the operability of the sensing element 102, i.e., monitor the ability of the sensor to detect leaks in the first state. In a number of embodiments, the operation of the sensing element 102 and leak detection system 1000 to execute these two operations is as follows: 1) measure the measured property between A and D to ensure acceptable operability of the circuit, first detection element 304, and sensing element 102; 2) measure the measured property between B and C to ensure acceptable operability of the circuit, first detection element 304, and sensing element 102; and 3) measure the measured property between A and B with C and D open to detect the first state (i.e. whether the sensor is in a first condition when dry and a second condition when wet) of the circuit, first detection element 304, and sensing element 102. The order of these steps can be varied and may be done on a continuous basis. Alternatively, the operation of the sensing element 102 and leak detection system 1000 to execute these two operations is as follows: 1) short points C and D to ensure acceptable operability of the circuit, first detection element 304, and sensing element 102; and 3) measure the measured property between A and B with C and D open to detect the first state (i.e. whether the sensor is in a first condition when dry and a second condition when wet) of the circuit, first detection element 304, and sensing element 102. As such, a method of using a leak detection system 1000 may include: 1) providing at least one leak detection system 1000 having a sensing element 102 having a first state having a first condition when dry and a second condition when wet, and a second state adapted to monitor the operability of the sensor, a communication device 104 operatively connected to the sensing element 102, and an attachment element 120 adapted to attach the leak detection system 1000 to a fluid component 121 having a fluid for monitoring fluid leakage; and 2) attaching the at least one leak detection system 1000 to the fluid component 121 for monitoring fluid leakage. It is contemplated in other embodiments, that the sensor can include a substrate adapted to produce luminescence, fluorescence, incandescence, a change in temperature, a change in pressure as a result of contacting fluid, or any other suitable changing characteristic in response to contacting fluid. The detection element can be selected accordingly to detect the changing condition of the substrate. For example, the detection element may include an optical sensor, a thermocouple, or a pressure transducer. As the substrate changes in condition (luminescence, fluorescence, incandescence, temperature, or pressure) as a result of contacting fluid, the detection element can sense the changed condition and generate a signal to the communication device 104 in order to generate an alert of a leakage.

Figure 13:
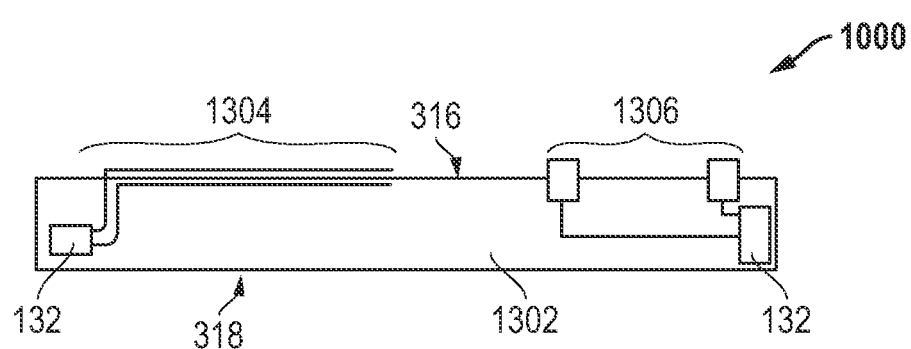
FIG. 13 includes a cross-sectional elevation view of a sensor including a sensing element having two detection elements in accordance with an embodiment.

FIG. 13 shows a cross-sectional elevation view of a sensor 100 including a sensing element 102 sensing element 102 having two detection elements in accordance with an embodiment. As illustrated in FIG. 13, and in accordance with an embodiment, a sensing element 102 may include at least two detection elements 1304 and 1306 disposed on one or more substrates 1302. In a particular embodiment, the detection elements 1304 and 1306 may be disposed on a same substrate 1302. In another particular embodiment, the detection elements 1304 and 1306 may be disposed on adjoining substrates (collectively referred to as "the substrate"). The detection elements 1304 and 1306 may be disposed on the same or different major surfaces 316 or 318 of the substrate 1302. As illustrated, and in accordance with another embodiment, the detection elements 1304 and 1306 may also be at least partially embedded within the substrate 1302.

In an embodiment, the detection elements 1304 and 1306 can be different from one another. That is, each of the at least two detection elements 1304 and 1306 may be adapted to detect a different condition of the substrate 1302. For example, as illustrated, the detection element 1304 may be similar to detection element 304 described above, whereas detection element 1306 may be similar to detection element 1104. In a particular embodiment, the detection elements 1304 and 1306 can be spaced apart on the substrate 1302. This may facilitate easier assembly of the sensing element 102 and permit easier removal of broken or unsuitable detection elements. In another embodiment, the detection elements 1304 and 1306 can overlap vertically or horizontally. Vertical or horizontal overlap may reduce the size of the sensor, thus reducing the space necessary to install the sensor.

In a number of embodiments, in a third state, the sensing element 102 (or sensor 100) may be used to measure the battery life of the sensing element 102 and/or power source 132. As stated above Lithium batteries or rechargeable batteries or other battery forms can be used as part of the power source 132. The battery life may be measured and communicated to a user as described below.

In a number of embodiments, in a fourth state, the sensing element 102 (or sensor 100) may be used to measure the signal strength of the communication device 104 and/or the sensor 100 itself. The signal strength of the sensor 100 may be measured and communicated to a user as described below.

Any of the detection elements described above may further include an electronic component, such as: a resistor, a capacitor, an inductor, a transistor, another similar component, or any combination thereof. Such electronic components may be necessary to develop complete circuits for the detection elements described above.

Referring again to FIG. 1, the communication device 104 may be operatively coupled to the sensing element 102 and/or communication hub 105. In an embodiment, the communication device 104 may transmit a signal to the communication hub 105 on the four states of the leak detection sensing element 102. In an embodiment, the communication device and/or communication hub 105 may include a controller or electronic control unit (ECU) adapted to manage the data received from the sensors, interpret the data, and organize the data to an end user in a format to monitor fluid leakage in the leak detection system 1000. The communication device 104 and/or communication hub 105 may include a controller including a computer or other computational device capable of understanding, analyzing, and/or executing one or more programmable languages. The controller and/or computer may include a processing unit able to process the information provided by the sensing element 102 (or sensor 100) (for example, leak detection, operability of the sensor, battery life, and signal strength). For example, a fluid leak signal from the sensing element 102 and may be received by the processing unit of the communication device 104. In some embodiments, the processing unit may include a PPC-3060S 6.5" Fanless Panel PC with Intel® Celeron® N2807 Processor.

In a number of embodiments, the processing unit of the communication device 104 and/or communication hub 105 may receive the signal from the sensing unit 102 with data regarding the first or second states of the sensor 100. Further, the processing unit of the communication device 104 and/or communication hub 105 may receive a signal with data regarding the third state from the power source 132. Lastly, the processing unit of the communication device 104 and/or communication hub 105 may receive a signal with data regarding the signal strength of the communication device 104 itself. In a number of embodiments, the communication device 104 may transmit a master signal to the communication hub 105 transmitting either the data itself from each of the components listed above, or a calculation of whether each of the four states crossed a threshold from an acceptable reading to an unacceptable reading. The communication hub 105 may calculate the calculation of whether each of the four states crossed a threshold from an acceptable reading to an unacceptable reading from the data provided from the communication device 104 or compile the results of the calculations already done on whether each of the four states crossed a threshold from an acceptable reading to an unacceptable reading by the communication device 104. The determination of whether an unacceptable reading has been achieved may be done by the controller in the communication device 104 and/or communication hub 105. For the first state, for example an acceptable reading would be the first condition (dry) and an unacceptable reading would be the second condition (wet). For the second state, for example, an acceptable reading would be the sensor is healthy and an unacceptable reading would be the sensor is unhealthy. For the third state, for example, an acceptable reading would be where the battery has a life of greater than 15% of the charge of the battery in a fully charged state and an unacceptable reading would be where the battery has a life of less than 15% of the charge of the battery in a fully charged state. For the fourth state, for example, an acceptable reading would be where the signal has a strength of at least −120 dBM in RSSI value and an unacceptable reading would be where the signal has a strength of less than −120 dBM in RSSI value. All of these values are exemplary and do not necessarily limit the thresholds contemplated regarding the embodiments herein. The thresholds themselves and/or their severity can be modified as needed for a given application. If the data is sent directly to the communication hub 105, then the communication hub 105 may calculate the threshold values and transmit the acceptable or unacceptable reading to a graphical user interface ("GUI") described in more detail below. In some embodiments, the thresholds may be further divided into magnitudes in terms of severity, detectability and probability. These threshold magnitudes may be ranked by number in these three categories with 10 being a very dangerous or threshold value to 1 being a minimal effect threshold value. These may be indicated and/or modified by the user based on the leak detection system 1000 application.

In a particular embodiment, the communication device 104 may be wirelessly connected to the sensing element 102, power source 132, and/or communication hub 105. This wireless communication may occur, for example, by Bluetooth or by another short range wireless protocol. In another particular embodiment, the communication device 104 may be connected to the sensing element 102 and/or communication hub 105 by a conductive wire. Care should be taken to ensure the conductive wire is not sensitive to the fluid being monitored. That is, the conductive wire should not be constructed from a material that will be destroyed upon fluid contact. Alternatively, the conductive wire may be insulated or otherwise protected against damaging fluid interaction by an outer layer or shield layer disposed between the wire and the suspected channel for fluid travel in the leak detection system 1000. In a further embodiment, the communication device 104 may be integral to the sensing element 102 and/or communication hub 105.

The communication device 104 and/or communication hub 105 may be a wireless or wired communication device. That is, the communication device 104 may operate wirelessly using wireless protocols, such as an HTML or HTML5; a local area network (LAN); or may operate with a wired interface. The communication device 104 may be adapted to receive an incoming signal from the sensing element 102 and send an outgoing signal to a communication hub or receiving device 105 when the sensing element 102 senses a fluid leakage. In this way the communication device 104 may be operatively connected to the communication hub 105 that can compile and analyze information from the sensing element 102 and give feedback to a user or the sensing element 102 itself based on a first state (first condition or a second condition) or second state of the sensing element 102 as explained herein.

In an embodiment, the communication device 104 and/or communication hub 105 may use a wireless network using a LoRa (Long Range) protocol to communicate with at least one sensing element 102. The LoRa wireless network may include a LoRa gateway. The communication device 104 and/or communication hub 105 may also connect with a Cloud Server. The communication device 104 and/or communication hub 105 may include a LoRa sensing node which may include a first LoRa controller and a LoRa wireless module, each connected to the power source 132 and optionally to a backup power source (not shown). Lithium batteries or rechargeable batteries or other battery forms can be used as part of the backup power source. The LoRa gateway may be included on at least one of the communication device 104 and/or the communication hub 105. The communication device 104 or communication hub 105 may communicate with the other of the communication device 104 or communication hub 105 via the LoRa gateway.

Computer program code for carrying out operations for aspects of the invention (such as one or more embodiments of the sensing element 102, communication device 104 or communication hub 105) may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). At least one of the sensing element 102, communication device 104, or communication hub 105 may include ROM or other existing storage organizations to include memory to record the data from the sensing element 102.

In an embodiment, the communication device 104 may continuously operate. As used herein, "continuously operate" refers to continuous, or uninterrupted, transmission of a signal from the communication device to, for example, a communication hub or receiving device 105. In an embodiment, the communication device 104 can passively operate. As used herein, "passively operate" refers to transmission of a signal, for example, to a communication hub or receiving device 105, only upon occurrence of a threshold condition— i.e., a fluid leak. For example, the communication device 104 may be powered by the power source 132. In an embodiment, only when the sensing element 102 senses a leakage might the communication device 104 receive power so as to transmit the signal to the communication hub or receiving device 105. This may increase operable lifetime of the leak detection system 1000 by reducing current draw from the power source 132, thus allowing for more remote positioning of the leak detection system 1000.

As illustrated, in an embodiment the communication device 104 may be exposed such that it extends beyond an outer surface of the substrate 106. Thus, the communication device 104 may be accessible such that a user can adjust or replace the communication device 104. In an embodiment, the communication device 104 may be at least partially, such as fully, embedded within the substrate 106. This may protect the communication device 104 from exposure to harmful fluids which may otherwise contact the communication device 104 if disposed on the surface of the substrate 106.

In an embodiment, the communication device 104 may be removable from the substrate 106. In another embodiment, the communication device 104 may be replaceable. An electrical interface may permit rapid replacement of the communication device 104. For example, the electrical interface may consist of one or more ports having electrical connection points which match electrical connection points on the communication device 104. The various communication devices 104 may have the same arrangement of electrical connection points, thereby enabling rapid replacement and interchanging there between.

In a number of embodiments, the leak detection system 1000 may include a housing as described in more detail below. In a number of embodiments, the housing may include a non-conductive material that at least partially isolates the plurality of detection elements (i.e. electrical circuits). In a number of embodiments, the housing may have a funnel shape to funnel liquid to the detection elements.

Referring still to FIG. 1, the leak detection system 1000 may further include an attachment element 120 adapted to attach the leak detection system 1000 to a surface adjacent to the fluid interface 114 (FIG. 2).

In an embodiment, the attachment element 120 may include a unitary body. That is, the attachment element 120 can be formed from a single piece. In another embodiment, the attachment element 120 may include a multi-piece construction. For example, the attachment element 120 may include at least two components engageable together, or to the substrate 106 or one or more components disposed thereon, to form a single piece.

In an embodiment, the attachment element 120 may be directly coupled to the substrate 106. In an embodiment, the attachment element 120 may be indirectly coupled to the substrate 106 through the sensing element 102, the communication device 104, or some other suitable intermediary objection.

The attachment element 120 may releasably couple to the leak detection system 1000 to a surface for monitoring fluid leakage. That is, in an embodiment, the attachment element 120 may be removable from the leak detection system 1000. This may permit replacement or adjustment of the attachment element 120 with respect to the leak detection system 1000. Over extended periods of usage (particularly at high temperatures or in damp conditions) it is possible for the attachment element 120 to degrade or wear—a problem which can be greatly mitigated by periodically replacing the attachment element 120. In another embodiment, the attachment element 120 may be integral with the leak detection system 1000. For example, the attachment element 120 may be molded or otherwise fabricated into the substrate 106, sensing element 102, or communication device 104 so as to be inseparable therefrom, thus preventing accidental separation during installation or over extended usage.

As illustrated in FIG. 1, in an embodiment the attachment element 120 may include a band 122, an engagement element 124 extending from the band 122, and an opening 126 adapted to receive the engagement element 124. To install the leak detection system 1000 on a fluid conduit, the band 122 may be positioned around the fluid conduit until the engagement element 124 can engage with the opening 126. The engagement element 124 can then be inserted into the opening 126 to hold the leak detection system 1000 relative to the fluid conduit. For applications requiring more secure attachment protocol, one or more additional attachment elements (e.g., attachment elements 128 and 130) may be deployed along the substrate 106 or in another suitable manner, such as described above. The attachment elements 122, 128, and 130 may each include a same or similar attachment protocol as one another. For example, the attachment element 128 may include engagement element 124 and opening 126 into which the engagement element 124 may be insertable. In an embodiment, the attachment elements 122, 128, and 130 may be spaced apart along the surface of the leak detection system 1000 to enhance engagement with the surface and to spread loading conditions across the substrate 106.

Figure 14:
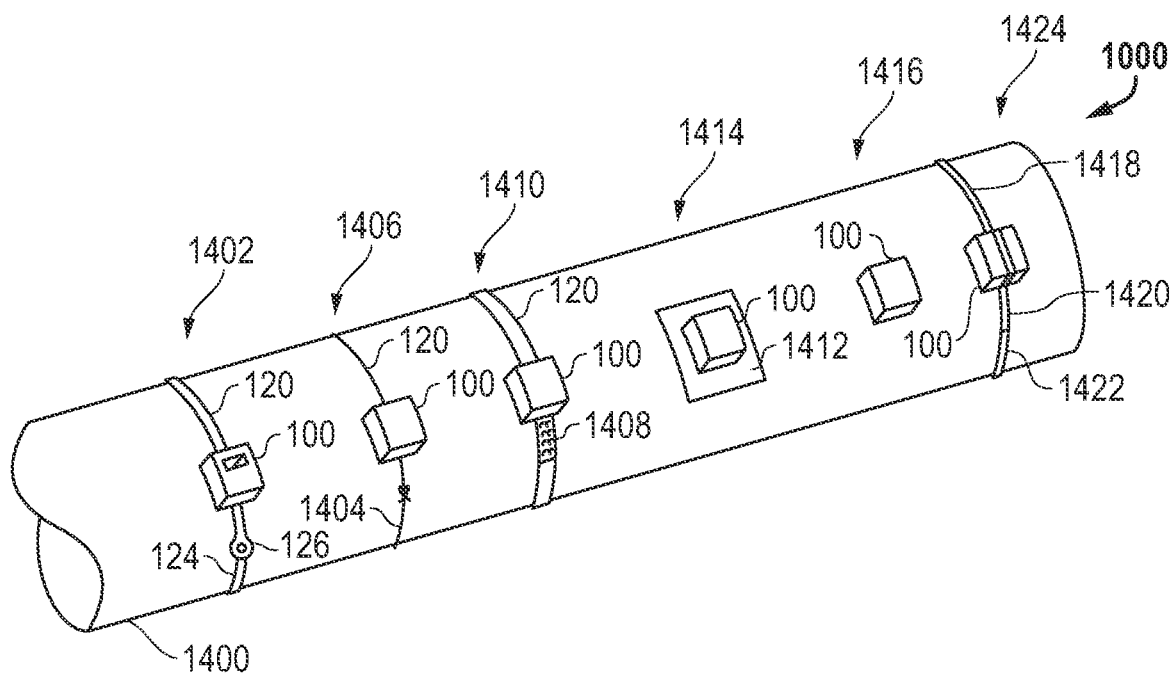
FIG. 14 includes a perspective view of a fluid conduit having a plurality of sensors coupled thereto, each sensor having a different attachment element in accordance with an embodiment.

FIG. 14 shows an installed leak detection system 1402 having a band 122, engagement element 124, and opening 126 installed around a fluid conduit 1400. In an embodiment, as shown in FIG. 14, the band 122 may be flexible or otherwise elastically deformable. The band 122 may be adapted to stretch around the fluid conduit, providing an inwardly oriented retention force that acts to pull the substrate 106 into the fluid conduit. Exemplary materials include woven fabrics, nonwoven fabrics, and polymers. Suitable polymers may include, for example, elastomers, such as rubber. In an embodiment, the attachment element 120 may have an unloaded size, $S_U$, as measured at rest, and a loaded size, $S_L$, as measured under loading conditions, where $S_L$ may be at least 1.01 $S_U$, or at least 1.1 $S_U$, or at least 1.5 $S_U$, or at least 2.0 $S_U$, or at least 5.0 $S_U$, or at least 10.0 $S_U$, or at least 20.0 $S_U$. In another embodiment, $S_L$ may be no greater than 200 $S_U$. In an embodiment, $S_L$ may be at least about 1.01 $S_U$ and no greater than about 200 $S_U$. The unloaded and loaded sizes may be a length of the attachment element 120—i.e., a length of the band 122—in the unloaded and loaded states, respectively.

In another embodiment, the attachment element 120 may include an elongated object 1404, such as a rope, a cord, a string, or other similar device. The elongated object 1404 may be tied around the surface of the fluid conduit 1400 to secure the leak detection system 1000 thereto. An installed leak detection system 1406 having an elongated object 1404 as an attachment element 120 is illustrated in FIG. 14. As illustrated, the ends of the elongated object 1404 may be tied together in a knot. In an embodiment, the leak detection system 1000 may be secured to the fluid conduit 1400 by a plurality of elongated objects 1404. The longitudinal ends of the elongated objects 1404 may be tied together at a same relative circumferential position along the fluid conduit. Alternatively, the longitudinal ends may be staggered around the circumference of the fluid conduit. In an embodiment, the elongated object 1404 may have an engagement mechanism at longitudinal ends thereof. For example, the elongated object 1404 may terminate in a buckle, a ratchet, an eyelet, a ratcheting tie system, a cable tie, a threaded or non-threaded fastener, or any other suitable engagement element permitting connection of opposing longitudinal ends of the elongated object 1404.

In yet a further embodiment, the attachment element 120 may include a hook and loop engagement system. Similar to the leak detection system 1000 described above with an elongated object 1404, it is contemplated that the attachment element 120 may include a band of material 1408 having a hook and loop engagement. The band 1408 may be elastic or non-elastic and may be wrapped around the fluid conduit 1400 such that a first portion of the band 1408 having hooks which may be coupled to a second portion of the band 1408 having loops. Such engagement may be rapidly removable and not likely to degrade over prolonged usage. An installed leak detection system 1410 having a hook and loop engagement as an attachment element 120 is illustrated in FIG. 14. In yet a further embodiment, the attachment element 120 may include a clip as described in further detail below.

Still referring to FIG. 14, in an embodiment, the attachment element 120 may include a system that does not extend around the entire circumference of the fluid conduit 1400.

For example, the leak detection system 1000 may be secured to the fluid conduit by an adhesive-backed material 1412. In a particular embodiment, the adhesive-backed material 1412 may be integral to the leak detection system 1000. In another particular embodiment, the adhesive-backed material 1412 may be a discrete element attached to the leak detection system 1000. As used herein, "discrete element" refers to a distinct component that is, or was at a previous time, separable from other objects upon application of a nominal force. An installed leak detection system 1414 having an adhesive-backed material 1412 as an attachment element 120 is illustrated in FIG. 14.

In another embodiment, the attachment element 120 may include a securing layer (not illustrated) disposed between the leak detection system 1000 and the fluid conduit 1400. The securing layer may include a paste, a gel, a putty, a material having a high plasticity, an epoxy, a solution, or any other substance which may be applied to one or both of the fluid conduit 1400 or leak detection system 1000. Upon curing, the securing layer can prevent removal of the leak detection system 1000. An installed leak detection system 1416 having a securing layer as an attachment element 120 is illustrated in FIG. 14.

In an embodiment, the securing layer may be relaxable so as to permit removal of the leak detection system 1000. For example, the securing layer may be softened or lose its adhesive properties upon introduction of a particular temperature, pressure, fluid interaction, or light type. Thus, a user can selectively disengage the leak detection system 1000 from the fluid conduit 1400.

In still another embodiment, the attachment element 120 may include a clamp 1418. The clamp 1418 may extend at least partially over or partially through the leak detection system 1000, providing a radially inward compressive force thereagainst. In an embodiment, the clamp 1418 may include two halves—a first half 1420 and a second half 1422—adapted to couple together to secure the leak detection system 1000 relative to the fluid conduit 1400. An installed leak detection system 1424 having a clamp 1418 as an attachment element 120 is illustrated in FIG. 14.

Figure 15:
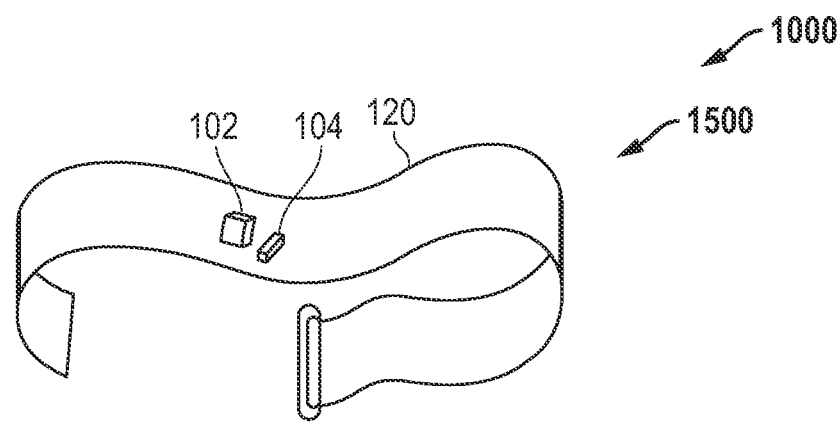
FIG. 15 includes a perspective view of a leak detection system in accordance with an embodiment.

FIG. 15 shows a perspective view of a leak detection system 1500 in accordance with an embodiment. As illustrated in FIG. 15, in accordance with an embodiment, the attachment element 120 may form the substrate onto which the sensing element 102 and communication device 104 are disposed. That is, a leak detection system 1500 in accordance with an embodiment can include the sensing element 102 and communication device 104 directly coupled to the attachment element 120. In a particular embodiment, direct coupling of the sensing element 102 and communication device 104 with the attachment element 120 may reduce weight of the leak detection system 1500 as compared to a previously described leak detection system 1000. Additionally, the leak detection system 1500 may position the sensing element 102 closer to the fluid interface 114 (FIG. 2) as compared to the leak detection system 1000. In a particular embodiment, the attachment element 120 may include a material having a high fluid transfer rate as described above with respect to the substrate 302. This may accelerate fluid transmission to the sensing element 102, thus decreasing lag time from occurrence of a leak until notification to a user or system which may then take steps to correct the leak.

As illustrated, the leak detection system 1500 may be disposed along a surface of the attachment element 120. In another embodiment, the leak detection system 1500 may be at least partially embedded in the attachment element 120. In yet another embodiment, the leak detection system 1500 may be fully embedded in the attachment element 120 such that the sensing element 102 may not be visible. In a particular embodiment, at least one of the sensing element 102 and communication device 104 may be at least partially visible through the attachment element 120.

Figure 16:
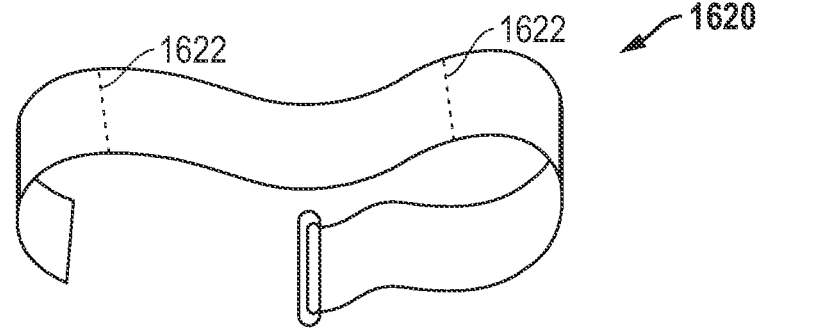
FIG. 16 includes a perspective view of an attachment element in accordance with an embodiment.

FIG. 16 illustrates an attachment element 1620 having a plurality of frangible portions 1622. As shown in FIG. 16, the frangible portions 1622 may permit resizing of the attachment element 1620. That is, the frangible portions may be selectively ruptured to adjust a length of the attachment element 1620. In this regard, the attachment element 1620 may have an initial length, as measured prior to use, and an operational length, as measured prior to attachment, where the operational length may be no greater than the initial length, such as less than the initial length.

In an embodiment, the attachment element may include only one frangible portion. In other embodiments, the attachment element may include at least 2 frangible portions, such as at least 3 frangible portions, or at least 4 frangible portions, or at least 5 frangible portions, or at least 6 frangible portions, or at least 7 frangible portions, or at least 8 frangible portions, or at least 9 frangible portions, or at least 10 frangible portions. In an embodiment, the attachment element may include no more than 1000 frangible portions. In an embodiment, the attachment element may include at least 2 frangible portions and no more than 1000 frangible portions.

Each frangible portion may include a structurally weakened portion of the attachment element. For example, the frangible portion may be defined by one or more apertures passing through the attachment element. The apertures may extend at least partially through a thickness of the attachment element. In a more particular embodiment, the apertures may extend fully through the thickness of the attachment element. The apertures may transverse the attachment element, interspaced, for example, by portions of the attachment element. The frangible portion may rupture upon generation of sufficient force in a transverse, or generally transverse, direction with respect to the attachment element.

Referring again to FIG. 1, the leak detection system 1000 can include power source 132 coupled to at least one of the sensing element 102, the communication device 104, the substrate 106, or the attachment element 120. In a particular embodiment, the power source 132 may include a battery or other charge storing device. In a more particular embodiment, the power source 132 may be rechargeable, for example by 120V power supply. The power source 132 may be removable from the leak detection system 1000 to permit replacement thereof. Lithium batteries or rechargeable batteries or other battery forms can be used as part of the power source 132.

In an embodiment, the leak detection system 1000 can receive power from an electrical outlet. The leak detection system 1000 may include a conductive wire extending from an element on the leak detection system 1000 and terminating in a plug adapted to be inserted into a wall outlet. In this regard, the leak detection system 1000 can receive a constant flow of current, eliminating the need to charge or monitor electrical supply to the leak detection system 1000.

Figure 17:
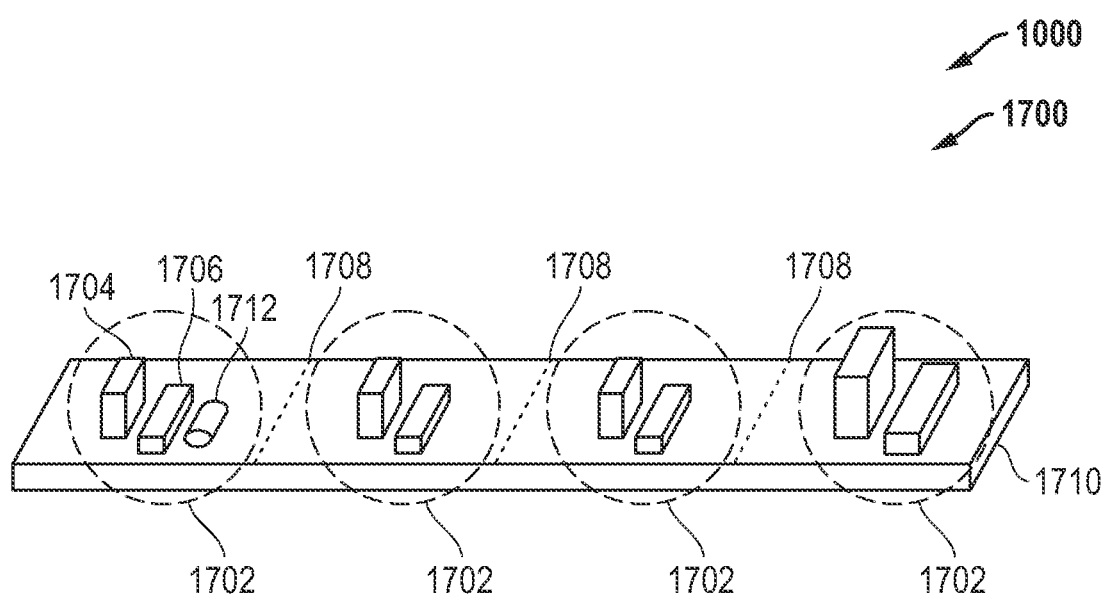
FIG. 17 includes a perspective view of a leak detection array in accordance with an embodiment.

FIG. 17 shows a leak detection array 1700 having a plurality of leak detection systems 1702 disposed on a length of material 1710. As shown in FIG. 17, the material 1710 may include a fabric, such a woven or nonwoven fabric, a film, or another suitable substrate formed from a textile, polymer, metal, alloy, or other suitable material. In a particular embodiment, the material 1710 may be flexible, permitting the leak detection array 1700 to bend.

Each leak detection system 1702 may include one or more features from the previously described leak detection systems 100, 1402, 1406, 1410, 1414, 1416, 1424, and 1500. In particular, each leak detection system 1702 may include a sensor 1704 and a communication device 1706. In an embodiment, the leak detection systems 1702 may be identical to one another. For example, a first leak detection system and a second leak detection system of the leak detection systems 1702 may be identical to one another. In another embodiment, the leak detection systems 1702 may be different from one another. For example, a first leak detection system of the leak detection systems 1702 may be different from a third leak detection system of the leak detection systems 1702. In another embodiment, at least two of the leak detection systems 1702 may include different leak detection systems previously described herein. That is, the leak detection systems 1702 of the leak detection array 1700 may operate differently than one another. For example, a first leak detection system of the leak detection array 1700 may be similar to that illustrated in FIG. 4 while a second leak detection system of the leak detection array 1700 may be similar to that illustrated in FIGS. 11 and 12.

In an embodiment, the leak detection array 1700 may be dividable into n-divisible sections, where n is the number of leak detection systems 1702 in the leak detection array 1700. Thus, for example, leak detection arrays 1700 with four leak detection systems 1702 (as illustrated in FIG. 17) include 4 dividable sections. In a particular instance, the leak detection array 1700 can include at least 2 leak detection systems, such as at least 3 leak detection systems, or at least 4 leak detection systems, or at least 5 leak detection systems, or at least 10 leak detection systems, or at least 20 leak detection systems, or at least 50 leak detection systems, or at least 100 leak detection systems. In an embodiment, the leak detection array 1700 can include no greater than 10,000 leak detection systems 1702. In an embodiment, the leak detection array 1700 can include at least 2 leak detection systems 1702 and no greater than 10,000 leak detection systems 1702.

Frangible portions 1708 disposed between adjacent leak detection systems 1702 may facilitate easier division of the adjacent leak detection systems 1702 and 1702. That is, the frangible portions 1708 may permit a user to selectively tear off a discrete leak detection system 1702 from the leak detection array 1700. In an embodiment, the frangible portions 1708 may rupture upon application of a force of at least 1 N, such as at least 2 N, or at least 5 N, or at least 10 N, or at least 100 N. In another embodiment, the frangible portions 1708 may rupture upon application of a force of no greater than 10,000 N, such as no greater than 1000 N, or no greater than 125 N. In another embodiment, the frangible portions 1708 may rupture upon application of a force of at least 1 N, and no greater than 10,000 N.

Each of the leak detection systems 1702 may be adapted to operate independently of the other leak detection systems 1702 of the leak detection array 1700. That is, each leak detection system 1702 may be self-sustaining and self-sufficient—requiring no further outside component for effective operation. In an embodiment, the leak detection systems 1702 may operate independently of one another or in smaller groups of leak detection arrays 1700, such as for example, two leak detection systems 1702 connected together.

In an embodiment, at least one of the leak detection systems 1702 can further include a power source 1712 coupled to at least one of the sensor 1704 and communication device 1706. In a particular embodiment, the power source 1712 may self-activate (i.e., generate current flow) upon rupture of the adjacent frangible portion 1708. This may preserve the power source 1712 until the at least one leak detection system 1702 is ready to be installed.

It is contemplated that the leak detection array 1700 may be rolled and stored in a housing, accessible through an opening therein. A user may grasp an exposed portion of the leak detection array to unwind the roll. Upon unwinding a suitable number of leak detection systems 1702, the user may tear the respective frangible portion 1708, separating the suitable leak detection systems 1702 from the remaining leak detection array 1700.

Figure 18A:
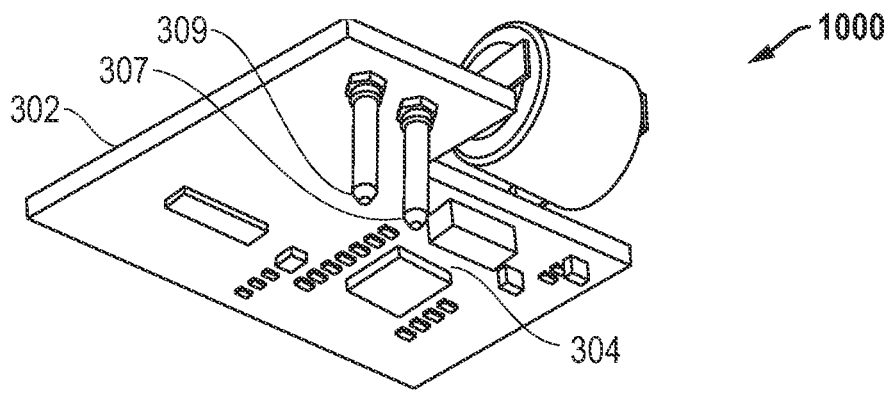
FIG. 18A includes a bottom view of a substrate used in an example leak detection system in accordance with an embodiment.
Figure 18B:
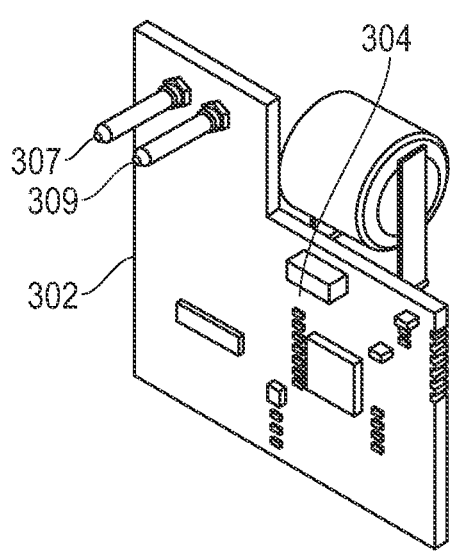
FIG. 18B includes a bottom perspective view of a substrate used in an example leak detection system in accordance with an embodiment.
Figure 18C:
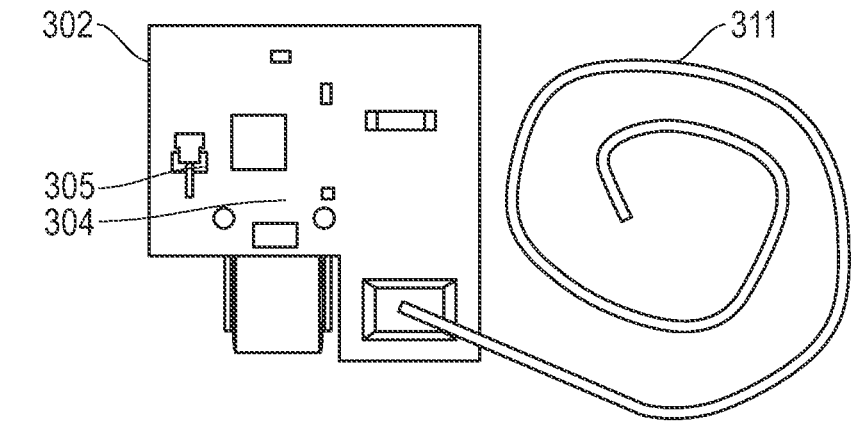
FIG. 18C includes a side view of a substrate used in an example leak detection system in accordance with an embodiment.

FIG. 18A includes a bottom view of a substrate used in an example leak detection system in accordance with an embodiment. FIG. 18B includes a bottom view of a substrate used in an example leak detection system in accordance with an embodiment. FIG. 18C includes a side view of a substrate used in an example leak detection system in accordance with an embodiment. As discussed above, the sensing element 102 may include a substrate 302 and a detection element 304. As stated above, the detection element 304 may include an electrical circuit paired to a substrate 302 that may include a circuit board. In a number of embodiments, a plurality of detection elements 304 in the form of a plurality of electrical circuits may be coupled to a substrate 302. In a number of embodiments, the electrical circuit may include an electrically conductive trace connected to a plurality of pins extending from the trace. As shown, the detection element 304 may include a first trace 305 connected to a first pin 307 and a second pin 309. A second detection element (not shown) on an opposing side (major surface) of the substrate 302 may include a first trace connected to a first pin and a second pin. In a number of embodiments, each detection element 304 may have its own power source. Alternatively, each detection element 304 may share a power source. In an embodiment, the pins 307, 309 may be removable. In another embodiment, as shown in FIG. 18C, a conductive wire wrap 311 may be paired to the substrate 302 and serve as a detection element to detect leaks outside the housing 115 of the sensor 100. The conductive wire wrap 311 may be flexible, allowing it to be uniquely positioned above fluid components to detect leaks in places too difficult to place a sensor 100 into. In this way, the pins 307, 309 may be extendable from the circuits and/or traces.

Figure 19A:
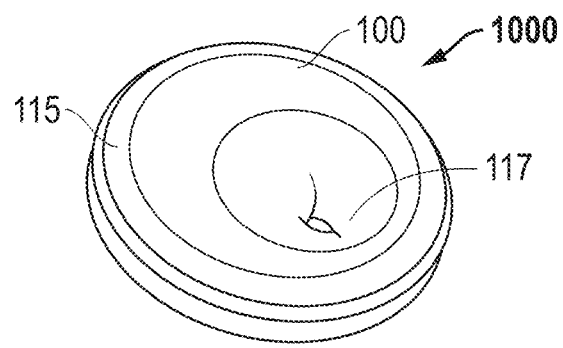
FIG. 19A includes a top perspective view of an example leak detection system in accordance with an embodiment.
Figure 19B:
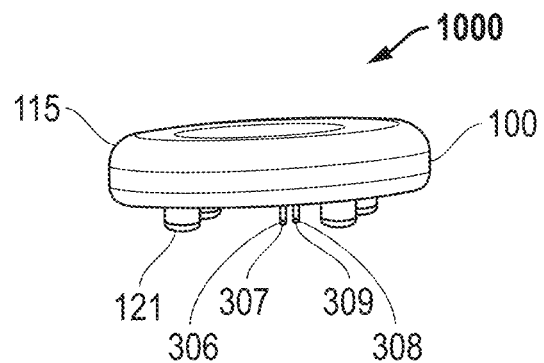
FIG. 19B includes a side perspective view of an example leak detection system in accordance with an embodiment.
Figure 19C:
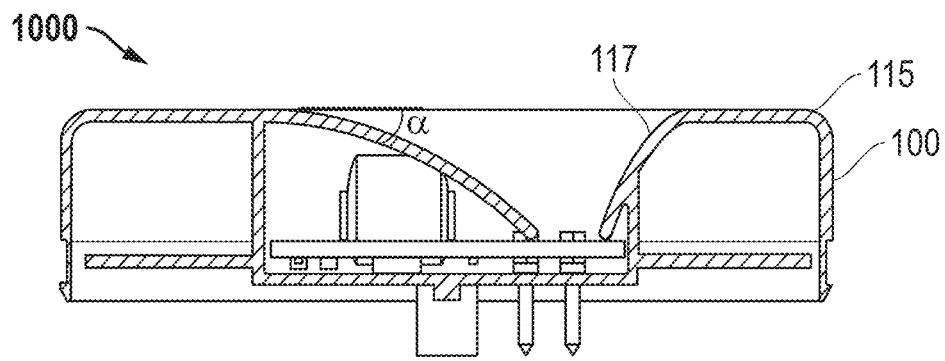
FIG. 19C includes a side cross-sectional view of an example leak detection system in accordance with an embodiment.
Figure 19D:
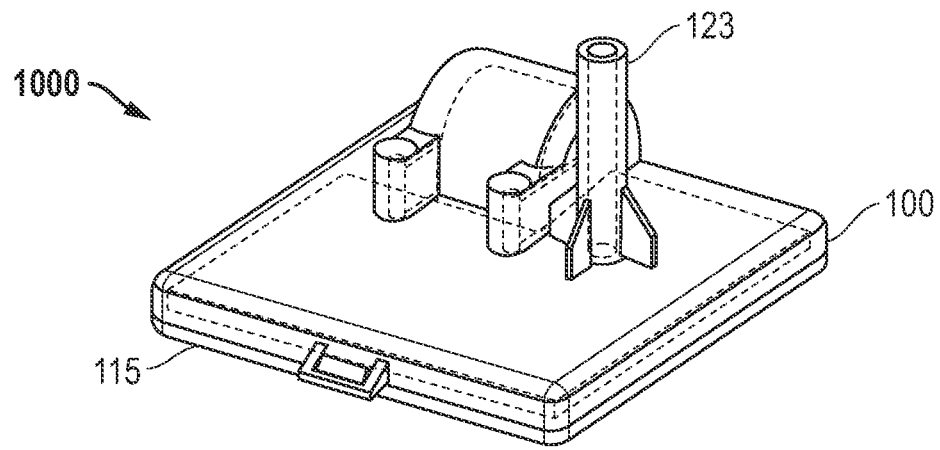
FIG. 19D includes a bottom view of an example leak detection system in accordance with an embodiment.
Figure 19E:
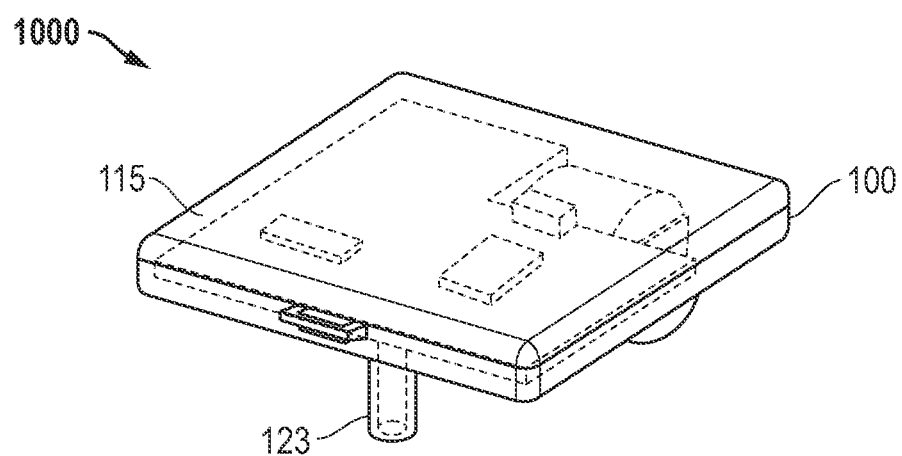
FIG. 19E includes a side perspective view of an example leak detection system in accordance with an embodiment.

FIG. 19A includes an illustration of a top perspective view of an example leak detection system 1000 including a sensor 100. FIG. 19B includes an illustration of a side perspective view of an example leak detection system 1000 including a sensor 100. FIG. 19C includes an illustration of a side cross-sectional view of an example leak detection system 1000 including a sensor 100. As stated above, the sensor 100 can include a housing 115. As shown, the housing 115 may house the substrate and may have a polygonal, circular, oval cross-section, or may be another shape. In a number of embodiments, the housing 115 may include a non-conductive material that at least partially isolates the plurality of detection elements (i.e. electrical circuits). In a number of embodiments, portions of the detection elements 304 may be located through the housing 115 to detect leaks outside the housing 115. For example, the pins of the detection element may protrude through the housing 115 to detect leaks as shown in FIG. 19B. The housing 115 may further include feet 121 that place the sensor 100 in an elevated position. In a number of embodiments, as shown in FIG. 19A, the housing 115 may have a funnel shape 117 including a funnel hole 119 to funnel liquid to the detection elements to detect leaks on multiple sides of the sensor 100. As shown best in FIG. 19C, the funnel shape 117 may be sloped at an angle α from a plane from a top surface of the housing 115. The angle α may be at least 1°, such as at least 10°, such as at least 20°, such as at least 30°, such as at least 45°, such as at least 60°, such as at least 75°, or such as at least 90°. If a fluid drips down through the funnel hole 119 and contacts the detection element 304, a leak may be detected as described above. FIG. 19D includes an illustration of a side view of an example leak detection system 1000 including a sensor 100. FIG. 19B includes an illustration of a bottom view of an example leak detection system 1000 including a sensor 100. As shown, the housing 115 of the sensor 100 may be a polygonal shape. Further, the housing 115 may include a cylindrical component 123 that may house the attachment component and/or the detection component, as described above.

Leak detection systems and arrays as described herein may be used on various fluid components for fluid leakage monitoring. Exemplary fluid component may be found in electronic device fabrication such as in the semiconductor and superconductor industry; medical devices such as fluid transport lines and pumps; pipe couplings such as those found in the oil and gas industry, potable water systems, and sewers; aerospace industry; food and beverage industry; and automotive industry. Embodiments of leak detection systems shown herein may detect leaks in difficult to reach places and may provide ease of use and improved performance over known leak detection systems, which may save valuable, corrosive, or purity controlled fluids, which would improve performance, productivity, and cost-effectiveness of their respective fluid systems.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A leak detection sensor comprising: a dielectric substrate comprising a circuit board material; and a plurality of electrical circuits in communication with the substrate, wherein the plurality of electrical circuits are located on different sides of the substrate.

Embodiment 2: A fluid system comprising: a fluid component having a fluid; and at least one leak detection sensor operatively coupled to the fluid component, the leak detection sensor comprising: a dielectric substrate comprising a circuit board material; and a plurality of electrical circuits in communication with the substrate, wherein the plurality of electrical circuits are located on different sides of the substrate.

Embodiment 3: A method of leak detection comprising: providing at least one leak detection sensor comprising: a dielectric substrate comprising a circuit board material; and a plurality of electrical circuits in communication with the substrate, wherein the plurality of electrical circuits are located on different sides of the substrate; and operatively coupling the at least one leak detection sensor to the fluid component for monitoring fluid leakage.

Embodiment 4: A leak detection sensor comprising: a first dielectric substrate; and a first electrical circuit in communication with the first substrate; a second dielectric substrate separated from the first dielectric substrate; and a second electrical circuit in communication with the second substrate, wherein the first electrical circuit and the second electrical circuit are operatively connected to a single power source.

Embodiment 5: The leak detection sensor, fluid system, or method of any of the preceding embodiments, wherein the plurality of electrical circuits each comprise an electrically conductive trace connected to a plurality of pins extending from the trace.

Embodiment 6: The leak detection sensor, fluid system, or method of any of the preceding embodiments, wherein the plurality of electrical circuits comprises a power source.

Embodiment 7: The leak detection sensor, fluid system, or method of any of the preceding embodiments, wherein a first electrical circuit is located on a first surface of the substrate and a second electrical circuit is located on a second surface of the substrate opposite the first surface of the substrate.

Embodiment 8: The leak detection sensor, fluid system, or method of any of the preceding embodiments, wherein the leak detection sensor further comprises a housing comprising a non-conductive material that at least partially isolates the plurality of electrical circuits.

Embodiment 9: The leak detection sensor, fluid system, or method of embodiment 7, wherein the housing comprises a funnel shape.

Embodiment 10: The leak detection sensor, fluid system, or method of any of the preceding embodiments, wherein the plurality of electrical circuits comprises at least one serpentine circuit.

Embodiment 11: The leak detection sensor, fluid system, or method of any of the preceding embodiments, wherein the sensor undergoes a change in a measured property in response to fluid contact.

Embodiment 12: The leak detection sensor, fluid system, or method of embodiment 10, wherein the measured property is at least one of resistance, impedance, capacitance, current, or voltage of the first detection element.

Embodiment 13: The leak detection sensor, fluid system, or method of embodiment 10, wherein the measured property is a physical change in the sensor.

Embodiment 14: The leak detection sensor, fluid system, or method of any of the preceding embodiments, wherein the leak detection sensor further comprises an attachment element adapted to attach the leak detection sensor to a fluid component.

Embodiment 15: The leak detection sensor, fluid system, or method of embodiment 14, wherein the attachment element is removably engageable with the fluid component for monitoring fluid leakage.

Embodiment 16: The leak detection sensor, fluid system, or method of embodiment 14, wherein the attachment component comprises a clip.

Embodiment 17: The leak detection sensor, fluid system, or method of any of the preceding embodiments, wherein the fluid component is at least one of a pipe, a pipe bend, manifold, elbow, a pipe coupling, a valve, a pump, a tank, filter housing, pressure vessel, liquid trap, exhaust line, vacuum condensate container, or a regulator.

Embodiment 18: The leak detection sensor, fluid system, or method of any of the preceding embodiments, further comprising a communication hub operatively connected to the communication device to compile and analyze information from the sensor.

Embodiment 19: The leak detection sensor, fluid system, or method of embodiment 18, wherein the communication hub is operatively connected to the communication device via a long range wireless network.

Embodiment 20: The leak detection sensor, fluid system, or method of any of the preceding embodiments, wherein the leak detection sensor is adapted to monitor a leak of a fluid comprising at least one of HF, $H_2SO_4$, $HNO_3$, NaClO, $H_2O_2$, $H_3PO_4$, Chemical Mechanical Planarization (CMP) fluids and slurries, HCL, deionized water, ethanol, isopropyl alcohol, acetone, a hydrocarbon solvent, or toluene.

Embodiment 21: The leak detection sensor, fluid system, or method of any of the preceding embodiments, wherein the plurality of circuits each comprise an electronic component comprising a resistor, a capacitor, an inductor, a transistor, or any combination thereof.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A leak detection sensor comprising:
   a dielectric substrate comprising a circuit board material; and
   a plurality of electrical circuits in communication with the substrate, wherein the plurality of electrical circuits are located on different opposing sides of the substrate, wherein the leak detection sensor further comprises a housing comprising a non-conductive material that at least partially isolates the plurality of electrical circuits, wherein the housing comprises a rigid funnel hole or cylindrical component adjacent to the dielectric substrate and adapted to feed fluid directly to the dielectric substrate, further comprising a communication hub operatively connected to a communication device to compile and analyze information from the sensor via a wireless network using a LoRa (Long Range) protocol.

2. The leak detection sensor of claim 1, wherein the plurality of electrical circuits each comprises an electrically conductive trace connected to a pin extending from the trace.

3. The leak detection sensor of claim 1, wherein the plurality of electrical circuits comprises a power source.

4. The leak detection sensor of claim 1, wherein the plurality of electrical circuits comprise a first electrical circuit is located on a first side of the substrate and a second electrical circuit is located on a second side of the substrate opposite the first side of the substrate.

5. The leak detection sensor of claim 1, wherein the housing comprises feet.

6. The leak detection sensor of claim 1, wherein the plurality of electrical circuits comprises at least one serpentine circuit.

7. The leak detection sensor of claim 1, wherein the sensor undergoes a change in a measured property in response to fluid contact.

8. The leak detection sensor of claim 7, wherein the measured property is at least one of resistance, impedance, capacitance, current, or voltage of at least one of the electrical circuits.

9. The leak detection sensor of claim 7, wherein the measured property is a physical change in the sensor.

10. The leak detection sensor of claim 1, wherein the leak detection sensor further comprises an attachment element adapted to attach the leak detection sensor to a fluid component.

11. The leak detection sensor of claim 10, wherein the attachment element is removably engageable with the fluid component for monitoring fluid leakage.

12. The leak detection sensor of claim 10, wherein the attachment component comprises a clip.

13. The leak detection sensor of claim 10, wherein the fluid component is at least one of a pipe, a pipe bend, manifold, elbow, a pipe coupling, a valve, a pump, a tank, filter housing, pressure vessel, liquid trap, exhaust line, vacuum condensate container, or a regulator.

14. The leak detection sensor of claim 1, wherein the leak detection sensor is adapted to monitor a leak of a fluid comprising at least one of HF, $H_2SO_4$, $HNO_3$, NaClO, $H_2O_2$, $H_3PO_4$, HCL, deionized water, ethanol, isopropyl alcohol, acetone, a hydrocarbon solvent, or toluene.

15. The leak detection sensor of claim 1, wherein the plurality of circuits each comprise an electronic component comprising a resistor, a capacitor, an inductor, a transistor, or any combination thereof.

16. A fluid system comprising:
a fluid component having a fluid; and
at least one leak detection sensor operatively coupled to the fluid component, the leak detection sensor comprising:
   a dielectric substrate comprising a circuit board material; and
   a plurality of electrical circuits in communication with the substrate, wherein the plurality of electrical circuits are located on different opposing sides of the substrate, wherein the leak detection sensor further comprises a housing comprising a non-conductive material that at least partially isolates the plurality of electrical circuits, wherein the housing comprises a rigid funnel hole or cylindrical component adjacent to the dielectric substrate and adapted to feed fluid directly to the dielectric substrate, further comprising a communication hub operatively connected to a communication device to compile and analyze information from the sensor via a wireless network using a LoRa (Long Range) protocol.

17. A method of leak detection comprising:
providing at least one leak detection sensor comprising:
   a dielectric substrate comprising a circuit board material; and
   a plurality of electrical circuits in communication with the substrate, wherein the plurality of electrical circuits are located on different opposing sides of the substrate; and
operatively coupling the at least one leak detection sensor to the fluid component for monitoring fluid leakage, wherein the leak detection sensor further comprises a housing comprising a non-conductive material that at least partially isolates the plurality of electrical circuits, wherein the housing comprises a rigid funnel hole or cylindrical component adjacent to the dielectric substrate and adapted to feed fluid directly to the dielectric substrate, further comprising a communication hub operatively connected to a communication device to compile and analyze information from the sensor via a wireless network using a LoRa (Long Range) protocol.

* * * * *